(12) United States Patent
Nakamura

(10) Patent No.: US 11,856,281 B2
(45) Date of Patent: Dec. 26, 2023

(54) IMAGING DEVICE AND METHOD

(71) Applicant: MAXELL, LTD., Kyoto (JP)

(72) Inventor: Yusuke Nakamura, Tokyo (JP)

(73) Assignee: MAXELL, LTD., Kyoto (JP)

( * ) Notice: Subject to any disclaimer, the term of this patent is extended or adjusted under 35 U.S.C. 154(b) by 187 days.

(21) Appl. No.: 17/632,828

(22) PCT Filed: Aug. 8, 2019

(86) PCT No.: PCT/JP2019/031352
§ 371 (c)(1),
(2) Date: Feb. 4, 2022

(87) PCT Pub. No.: WO2021/024452
PCT Pub. Date: Feb. 11, 2021

(65) Prior Publication Data
US 2022/0272239 A1 Aug. 25, 2022

(51) Int. Cl.
*H04N 23/55* (2023.01)
*H04N 25/60* (2023.01)

(52) U.S. Cl.
CPC ............ *H04N 23/55* (2023.01); *H04N 25/60* (2023.01)

(58) Field of Classification Search
CPC .............................. H04N 23/55; H04N 25/60
USPC ........................................................ 348/241
See application file for complete search history.

(56) References Cited

U.S. PATENT DOCUMENTS

| | | | |
|---|---|---|---|
| 7,897,903 B2 * | 3/2011 | Duparre | H04N 23/55 348/340 |
| 2019/0339485 A1 | 11/2019 | Nakamura et al. | |
| 2020/0084350 A1 | 3/2020 | Kishine et al. | |
| 2020/0084376 A1 | 3/2020 | Naruse et al. | |

FOREIGN PATENT DOCUMENTS

| | | |
|---|---|---|
| WO | 2017/149687 A1 | 9/2017 |
| WO | 2018/221019 A | 12/2018 |
| WO | 2018/221025 A1 | 12/2018 |

OTHER PUBLICATIONS

International Search Report of PCT/JP2019/031352 dated Oct. 12, 2019.

* cited by examiner

*Primary Examiner* — Joel W Fosselman
(74) *Attorney, Agent, or Firm* — Mattingly & Malur, PC

(57) ABSTRACT

The imaging device includes: a modulator configured to modulate a light intensity in accordance with a real pattern; an image sensor configured to create a sensor image in accordance with the modulated light; and a micro lens array including a plurality of micro lenses arranged to correspond to a plurality of pixels of the image sensor. The imaging device has a distribution property of a relative positional difference amount between a center position of a light receiver of each pixel of the plurality of pixels and a center position of each micro lens of the plurality of micro lenses of the micro lens array in a plane of the image sensor. This property has at least one point or more with a changing difference value of the difference amount between the adjacent pixels from a positive value to a negative value or from a negative value to a positive value.

12 Claims, 35 Drawing Sheets

FIG. 4
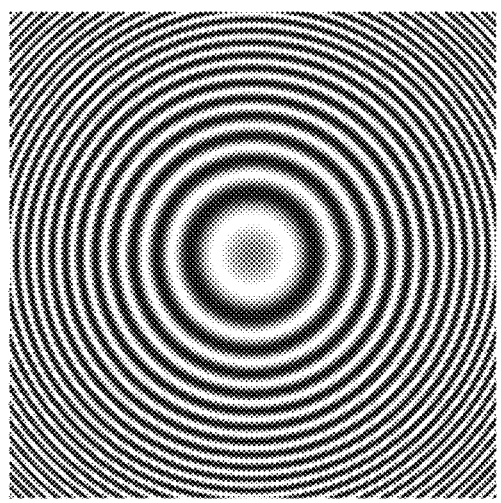
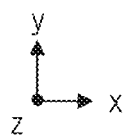

FIG. 5
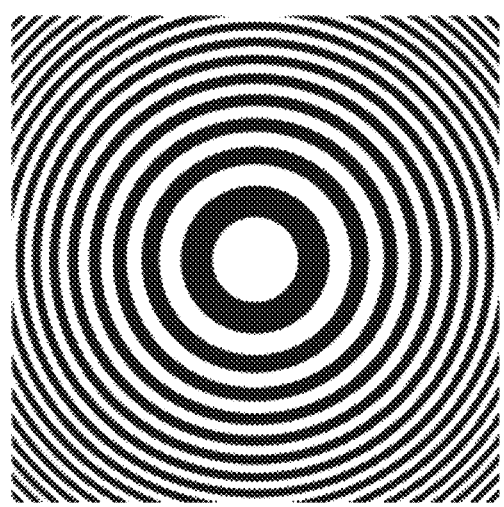
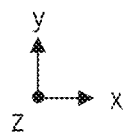

FIG. 27
(A)
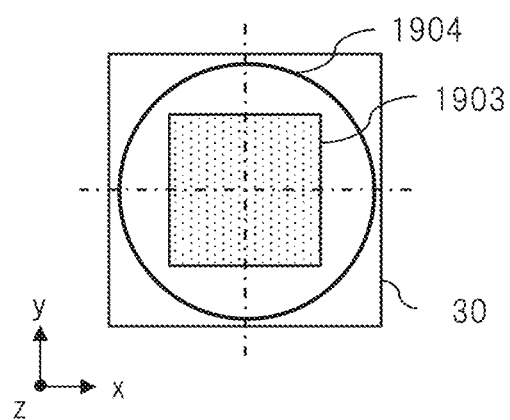
(B)
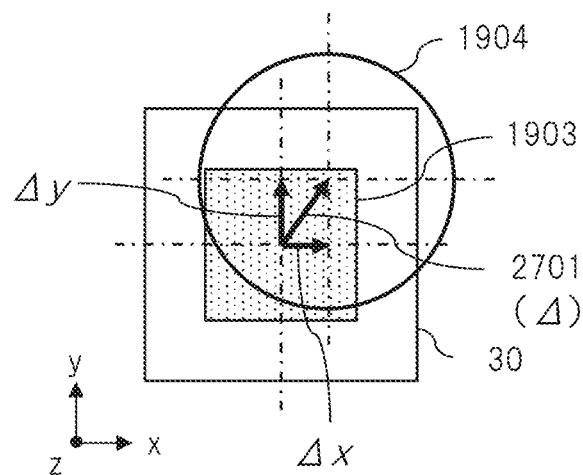

FIG. 28
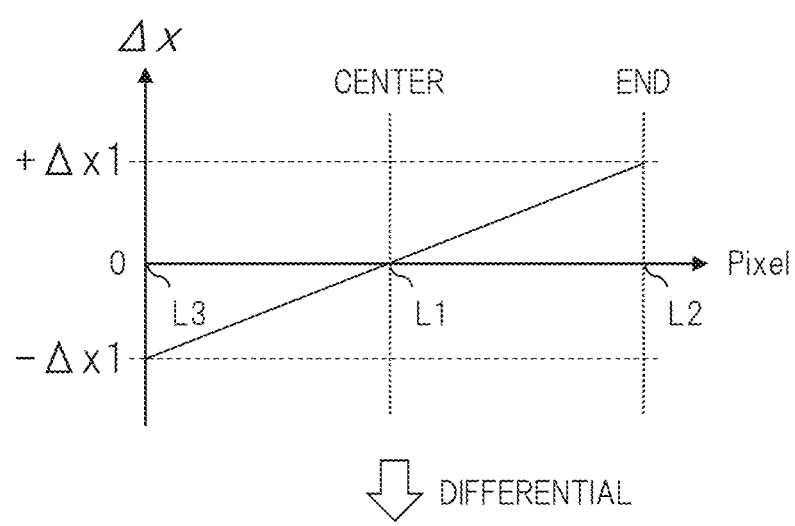
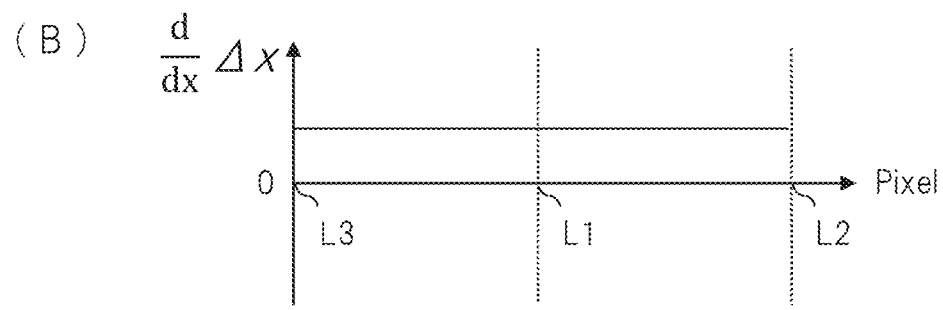

FIG. 31
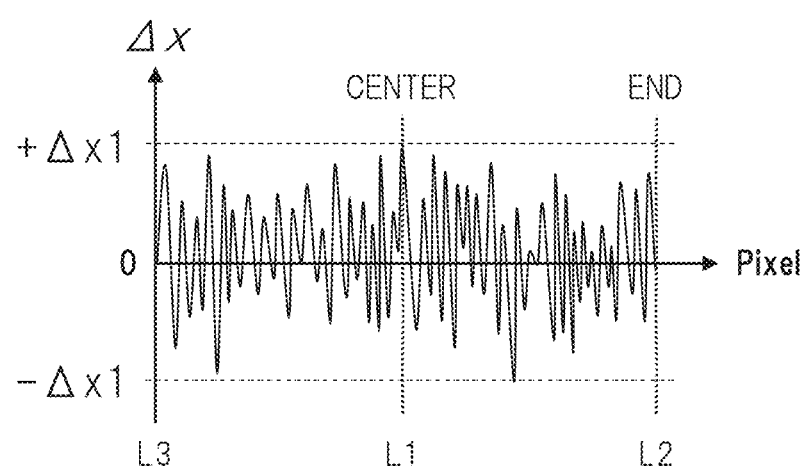
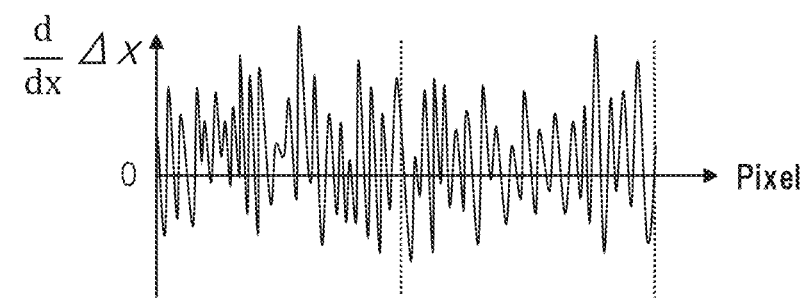

FIG. 34
(A) 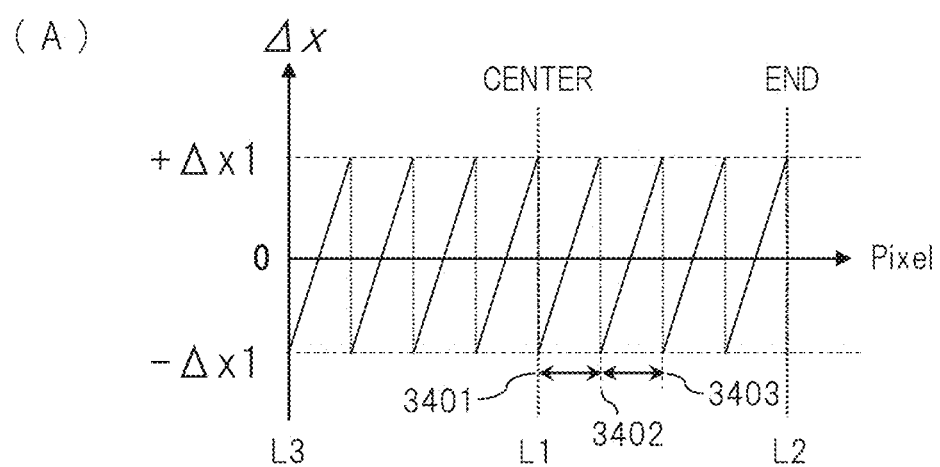
(B) 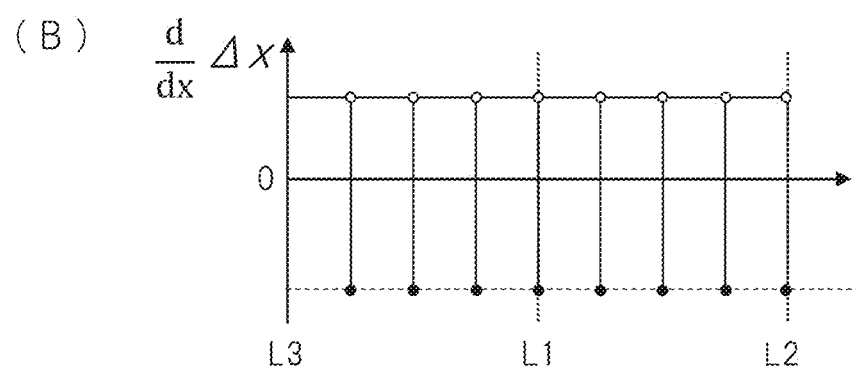

FIG. 36
(A)
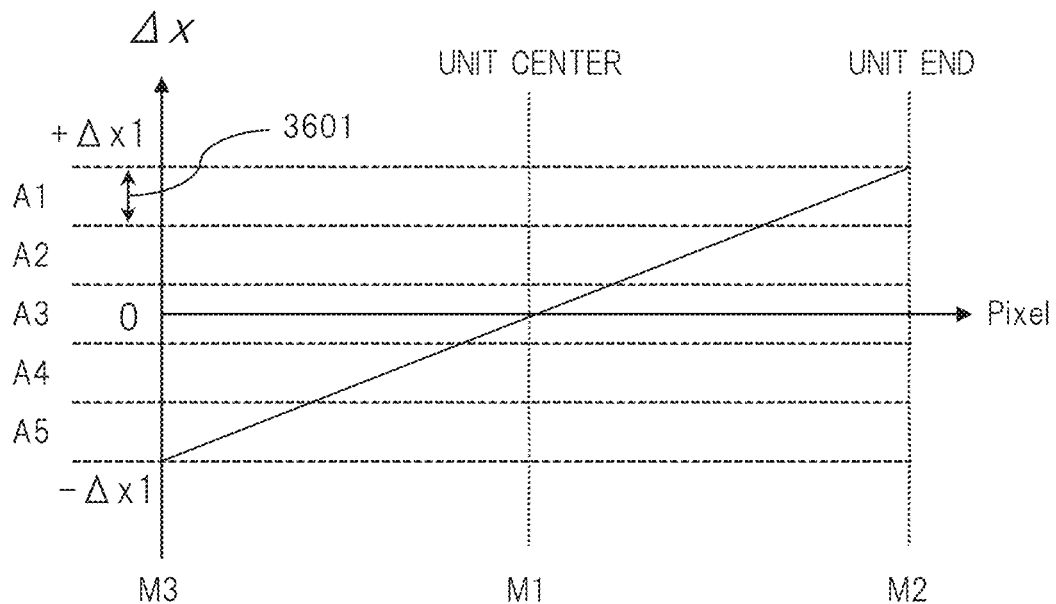
(B)
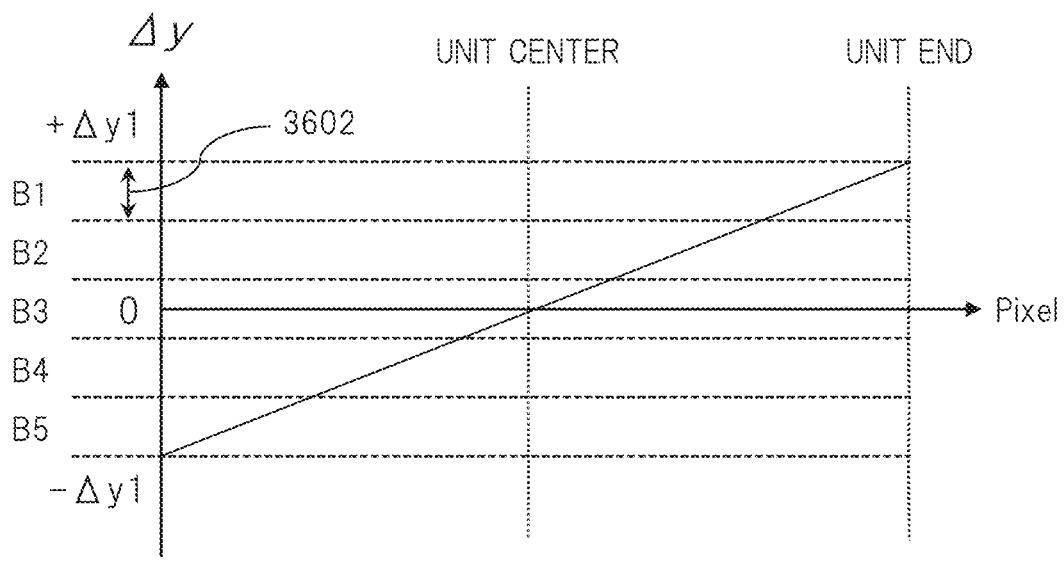

FIG. 37
(A)
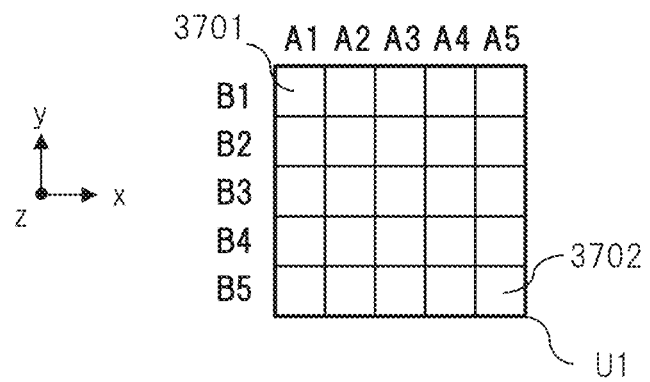
(B)
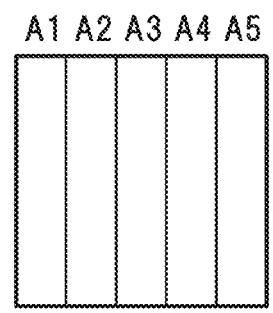
(C)
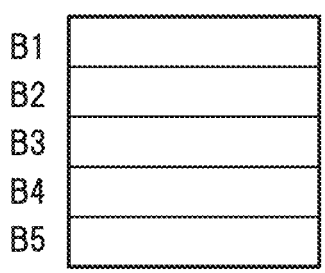

FIG. 38
(A)
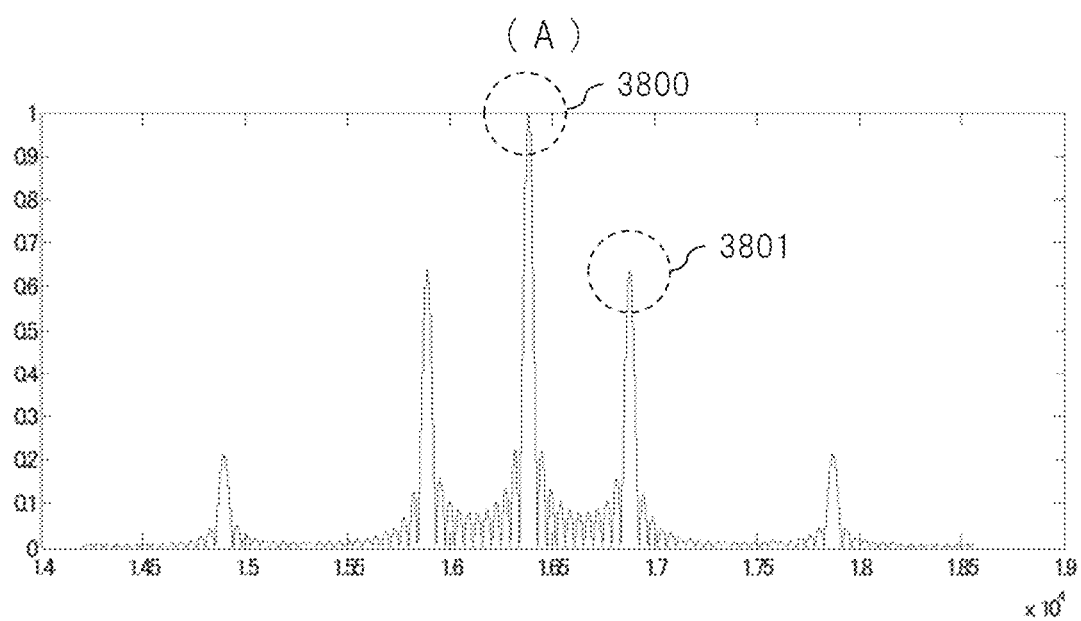
(B)
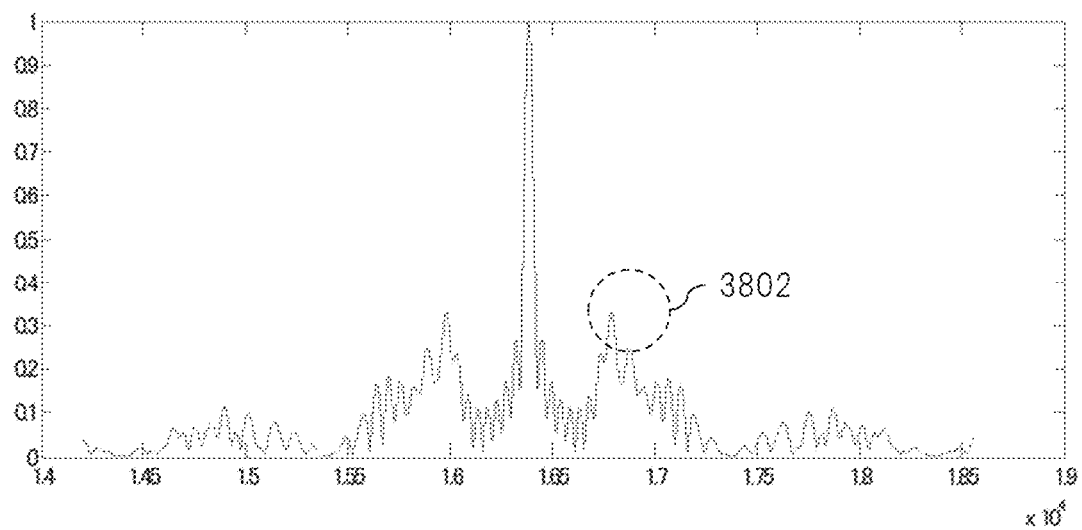

IMAGING DEVICE AND METHOD

TECHNICAL FIELD

The present invention relates to a technique of an imaging device.

BACKGROUND ART

As a related art example of the imaging device, International Patent Publication No. WO/2017/149687 (Patent Document 1) is exemplified. The Patent Document 1 (Abstract) describes that "an imaging device achieving high functionality is provided by easiness in detection of an incident angle of light ray penetrating a grid substrate. This is achieved by an imaging device including: an image sensor configured to convert and output an optical image taken in a plurality of array-formed pixels on an imaging plane into an image signal; a modulator arranged in a light receiving plane of the image sensor and configured to modulate an optical intensity; an image storage configured to temporarily store the image signal output of the image sensor; and a signal processer configured to perform an image process to the image signal output of the image storage, the modulator has a first grid pattern made of a plurality of concentric circles, and the signal processer creates a moire stripe image by modulating the image signal out of the image storage to be a virtual second grid pattern made of a plurality of concentric circles, and changes a size of the concentric circles of the second grid pattern in accordance with a focus position."

RELATED ART DOCUMENT

Patent Document

Patent Document 1: International Patent Publication No. WO/2017/149687

SUMMARY OF THE INVENTION

Problems to be Solved by the Invention

As described in the related art example, a lensless imaging device including a lensless camera not using a lens has been proposed as an imaging device including a camera, and has been expected as an imaging device achieving downsizing and low cost. And, network communication of the imaging device has been essential for widening an application range of the imaging device such as image analysis.

However, the lensless imaging device of the related art example has a room for studies on suitable properties of the image sensor for the imaging. The Patent Document 1 does not describe the suitable properties of the image sensor for the imaging using the lensless imaging device.

A purpose of the present invention relates to a technique of a lensless imaging device, and is to provide a technique for the suitable properties, structures, process methods and others of the image sensor for the imaging.

Means for Solving the Problems

A typical embodiment of the present invention provides the following configuration. An imaging device of one embodiment includes: a modulator configured to modulate an intensity of incident light in accordance with a real pattern; an image sensor configured to convert the modulated light into an electric signal and create a sensor image; and a micro lens array including a plurality of micro lenses arranged to correspond to a plurality of pixels of the image sensor, and has a distribution property of a relative positional difference amount between a center position of a light receiver of each pixel of the plurality of pixels and a center position of each micro lens of the plurality of micro lenses of the micro lens array in a plane of the image sensor, the property having at least one point or more with a changing difference value of the difference amount between the adjacent pixels from a positive value to a negative value or from a negative value to a positive value.

Effects of the Invention

The typical embodiment of the present invention can provide the suitable properties, structures, processing methods and others of the image sensor for the imaging in the lensless imaging device.

BRIEF DESCRIPTIONS OF THE DRAWINGS

FIG. 4 is a diagram showing a configurational example of a real pattern or a virtual pattern in the first embodiment;

FIG. 5 is a diagram showing a configurational example of a real pattern or a virtual pattern in the first embodiment;

FIG. 27 is a diagram showing an example of relative positional difference between a micro lens and a pixel;

FIG. 28 is a diagram showing an example of change of the relative positional difference between the micro lens and the pixel in a plane of the image sensor;

FIG. 31 is a diagram showing a configurational example of change of the relative positional difference between the micro lens and the pixel in the plane of the image sensor in the first embodiment;

FIG. 34 is a diagram showing a configurational example of change of a relative positional difference between a micro lens and a pixel in a plane of an image sensor in an imaging device of a second embodiment of the present invention;

FIG. 36 is a diagram showing an example of a process dividing method for the relative positional difference between the micro lens and the pixel in the second embodiment;

FIG. 37 is a diagram showing an example of division in a unit in the second embodiment;

FIG. 38 is a diagram showing an example of PSF of a reconstructed image in the second embodiment;

BEST MODE FOR CARRYING OUT THE INVENTION

Hereinafter, embodiments of the present invention will be described in detail with reference to the accompanying drawings. Note that the same components are denoted by the same reference symbols in principle throughout all the drawings, and the repetitive description thereof will be omitted. In the embodiments described below, the invention will be described in a plurality of sections or embodiments when required. These sections or embodiments are relevant to each other as a modification example, details, or a supplementary explanation thereof. The number, the amount, the range, the size, the shape of the components, the positional relation thereof, and the like that are mentioned are not limited to the specific number or others. The shape of the component or others includes the approximate or similar shape or others.

First Embodiment

With reference to FIGS. 1 to 33 and others, an imaging device and an imaging method of the first embodiment of the present invention will be explained. The imaging method of the first embodiment is a method including steps executed by the imaging device of the first embodiment. The imaging device of the first embodiment is the imaging device to which the imaging method of the first embodiment is installed.

<Principle of Imaging of Object at Infinite Distance>

A principle of imaging of an object at infinite distance and others will be mainly explained below.

[Imaging Device]

Figure 1:
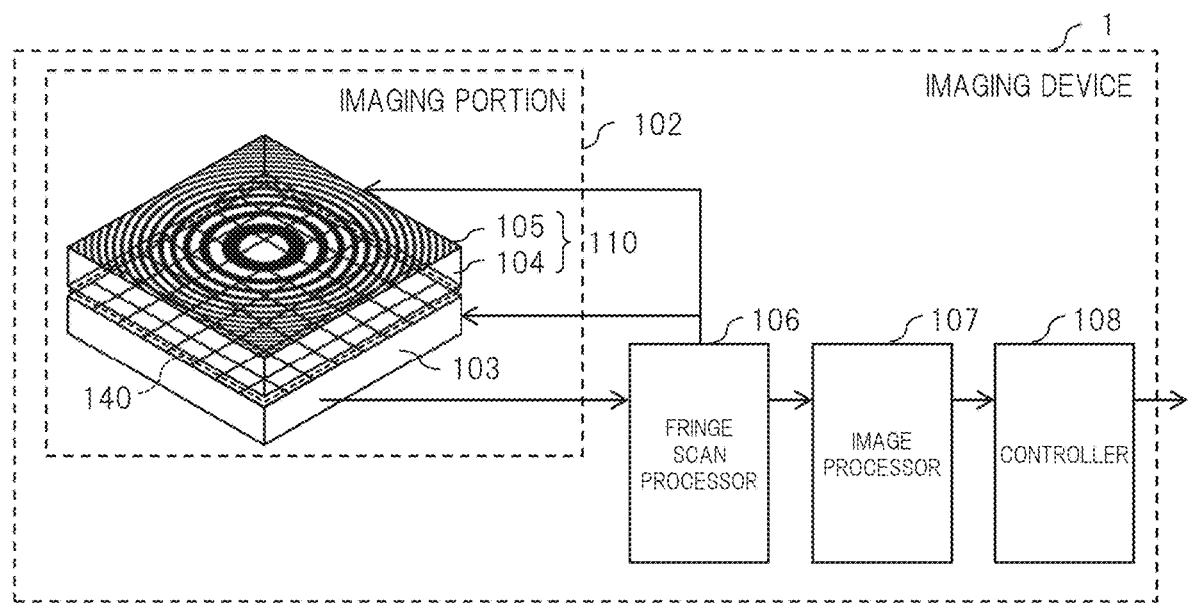
FIG. 1 is a diagram showing a configurational example of an imaging device of a first embodiment of the present invention.

FIG. 1 shows a configurational example of an imaging device of the first embodiment. The imaging device in FIG. 1 is a lensless camera capturing an image of an object in outside while not using an imaging lens. The imaging device 1 includes an imaging portion 102, a fringe scan processer 106, an image processer 107 and a controller 108. The imaging portion 102 includes an image sensor 103, a micro lens array 140 and a modulator 110. The modulator 110 includes a pattern substrate 104 and a real pattern 105. The image sensor 103 is a device that converts light into an electric signal and creates a sensor image. The modulator 110 is a combined portion of the pattern substrate 104 and the real pattern 105, and is a device that modulates an intensity of light entering the image sensor 103 and being detected, in accordance with the real pattern 105.

Figure 2:
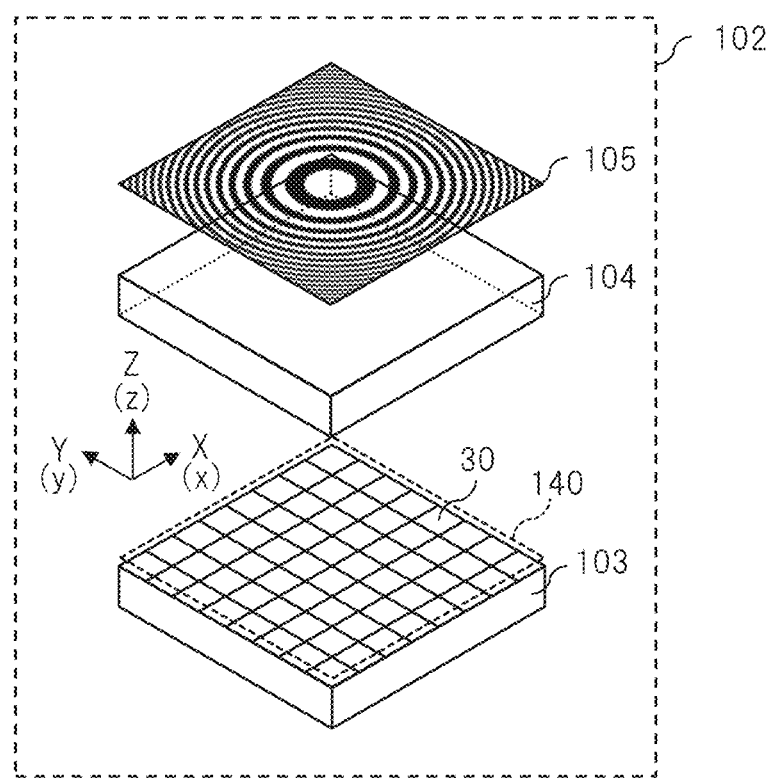
FIG. 2 is a diagram showing a configurational example of an imaging portion of the first embodiment.

FIG. 2 shows an exploded view of components in a configurational example of the imaging portion 102. Note that an x-axis direction, a y-axis direction and a z-axis direction are used as explanatory directions. The x-axis direction and the y-axis direction are two orthogonal directions making a principal plane of the image sensor 103 or others, and the z-axis direction is a direction being vertical to the principal plane, corresponding to an optical axis, a thickness or others and being up and down directions in the drawing. On a light receiving plane of the image sensor 103 (on an upper plane of the drawing), a plurality of pixels 30 are arranged as an array. Above the light receiving plane of the image sensor 103, a micro lens array 140 described later is arranged. Above the light receiving plane of the image sensor 103, the pattern substrate 104 is arranged through the micro lens array 140. The pattern substrate 104 is tightly fixed to, for example, the micro lens array 140. However, the present invention is not limited to this arrangement, and these components may be arranged to separate.

The real pattern 105 is formed on an upper surface of the pattern substrate 104 in the drawing. The pattern substrate 104 is made of a material such as a glass or a plastic that is transmittable for visible light. The real pattern 105 may be formed by, for example, a sputtering method or others used in a semiconductor process to deposit a metal such as aluminium or chromium. Contrast of the real pattern 105 for modulating a transmissivity is made of, for example, a pattern with the deposited aluminium and a pattern without the deposited aluminium. Regarding the method and the means for the formation of the real pattern 105, the present invention is not limited to this, and the method or the means may be a means of achieving the modulation of the transmissivity such as a method of making the contrast by, for example, printing using an inkjet printer or others. And, in the present specification, the visible light has been explained for the explanation. However, the present invention is not limited to this, and a material having a transmissivity to a target wavelength for the imaging may be used for the pattern substrate 104 while a material that can transmit or shield the light may be used for the real pattern 105. For example, in a case of an imaging device 1 performing far infrared-ray imaging, a material such as germanium, silicon, chalcogenide or others having a transmissivity to the far infrared ray may be used for the pattern substrate 104 while a material that can transmit or shield the far infrared ray may be used for the real pattern 105. Note that the present specification has described an aspect of the formation of the real pattern 105 on the pattern substrate 104. However, the present invention is not limited to this, and a different aspect such as usage of a display element may be used.

Figure 3:
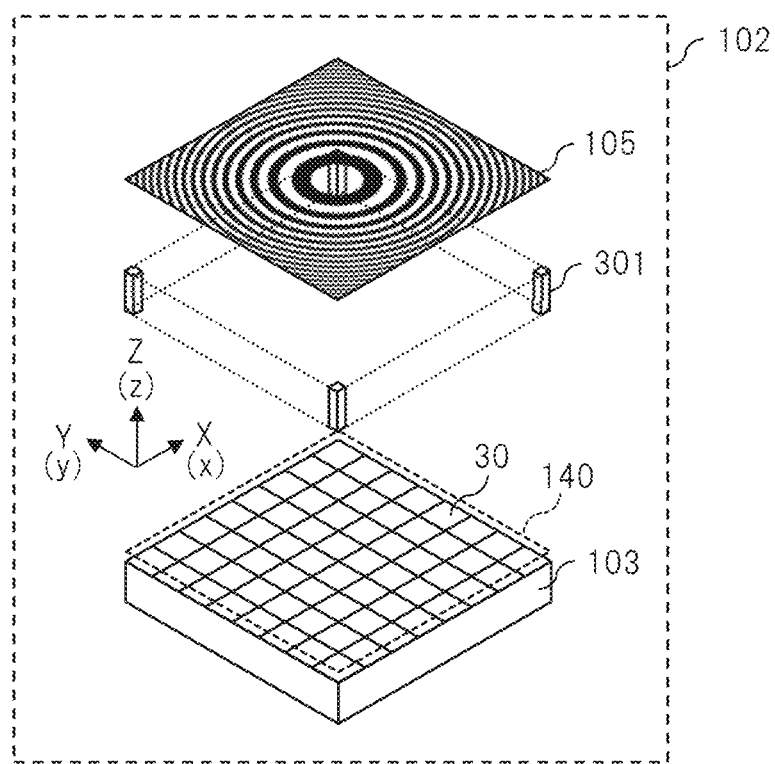
FIG. 3 is a diagram showing a configurational example of an imaging portion of a modification example of the first embodiment.

As a modification example, FIG. 3 shows a configuration of the imaging portion 102 in a different aspect. The real pattern 105 is formed as a thin film in the imaging portion 102 in FIG. 3, and this real pattern 105 is held to the image sensor 103 and others by a support member 301.

An angle of view of the imaging of the imaging device 1 in the aspect of FIGS. 1 and 2 varies depending on a thickness of the pattern substrate 104. Therefore, for example, when the pattern substrate 104 has the configuration of FIG. 3 to have a function capable of changing a length of the support member 301 in the z-axis direction in the drawing, a function capable of changing the angle of view in the imaging is achieved.

On an upper surface of the image sensor 103 in FIG. 2, pixels 30 that are light receiving elements are orderly arranged in, for example, a grid formation. This image sensor 103 converts light images received by the pixels 30 into image signals that are electric signals. As shown in FIG. 1, the image signals out of the image sensor 103 are subjected to the image processing through the fringe scan processer 106 by the image processer 107, and are output through the controller 108.

In the configuration of the imaging device 1, at the time of the imaging, a light intensity of the light penetrating the real pattern 105 is modulated by the real pattern 105. The modulated light having penetrated the modulator 110 penetrates the micro lens array 140, and is received by the image sensor 103. Noises of the image signals out of the image sensor 103 are cancelled by the fringe scan processer 106. The noise-cancelled signals are subjected to the image processing by the image processer 107 to restore the image. The image-processed image data is output to the controller 108. When the image data out of the image processer 107 is output to a host computer, an external storage medium or others, the controller 108 converts a data format of the image data to be fixed to an interface such as a USB or others and outputs it. Note that the image signals, the image data or others may be stored in a memory inside the imaging device 1.

[Principle of Imaging]

Next, a principle of the imaging in the imaging device 1 will be explained. First, the real pattern 105 is made of a concentric circles pattern having a pitch reducing in inverse proportion to a radius positioned from its center. The real pattern 105 is defined by the following equation 1 using a radius "r" positioned from reference coordinates at the center of the concentric circles and a coefficient "β". The real pattern 105 is designed to have the transmissivity that is modulated in proportion to a term "I(r)" of the equation 1.

[Equation 1]

$$I(r)=1+\cos \beta r^2 \qquad \text{Equation 1:}$$

A plate having such a stripe is called a Gabor zone plate or a Fresnel zone plate. FIG. 4 shows an example of a Gabor zone plate based on the equation 1 as a configurational example of the real pattern 105. This Gabor zone plate is a transmissivity-modulating pattern having multiple-valued contrasts. As another configurational example of the real pattern 105, FIG. 5 shows an example of a Fresnel zone plate expressed by binarization of the equation 1 taking 1 as a threshold. This Fresnel zone plate is a transmissivity-modulating pattern having binarized contrasts. White parts correspond to transparent parts while black parts correspond to non-transparent parts. A virtual pattern corresponding to the real pattern 105 also has the same pattern. Note that only the x-axis direction of FIG. 2 will be mainly expressed by expressions below for simplification. However, two-dimensional expansion can be considered in the similar consideration about the y-axis direction.

Figure 6:
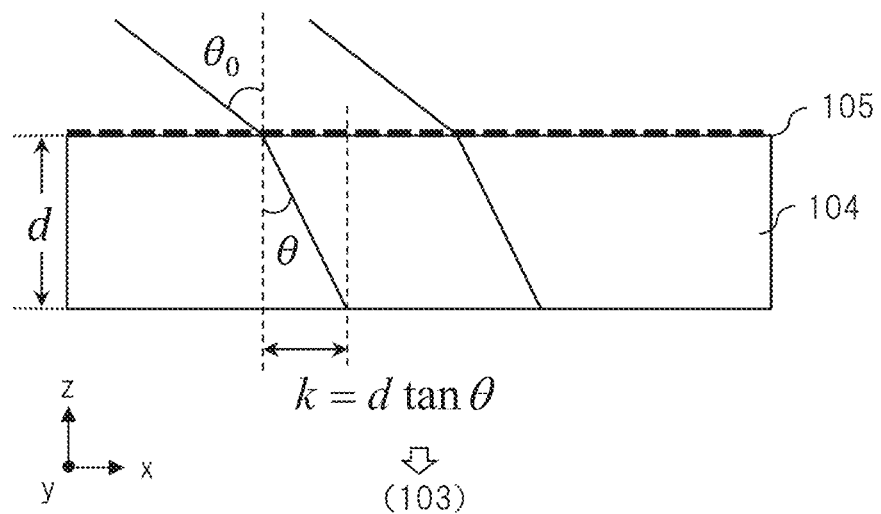
FIG. 6 is an explanatory diagram for light entering a pattern substrate in the first embodiment.

FIG. 6 is an explanatory diagram about the pattern substrate 104. With reference to FIG. 6, occurrence of in-plane shift of a shadow from the real pattern 105 on the surface of the pattern substrate 104 to the image sensor 103 due to oblique incident collimated light will be explained. As shown in FIG. 6, it is assumed that, at an angle "θ0" in the x-axis direction, the collimated light enters the pattern substrate 104 having a thickness "d" on which the real pattern 105 is formed. When a refraction angle in the pattern substrate 104 is "θ", light having a transmissivity of the real pattern 105 on the surface of the pattern substrate 104 geometrically refracts by an amount of "k=d·tan θ" in the drawing, and enters the image sensor 103. In this case, a shadow having an intensity distribution as expressed by the following equation 2 is detected on the image sensor 103. Note that a term "φ" of the equation 2 represents an initial phase of a transmissivity distribution of the equation 1.

[Equation 2]

$$I_F(x)=1+\cos[\beta(x+k)^2+\Phi] \qquad \text{Equation 2:}$$

Figure 7:
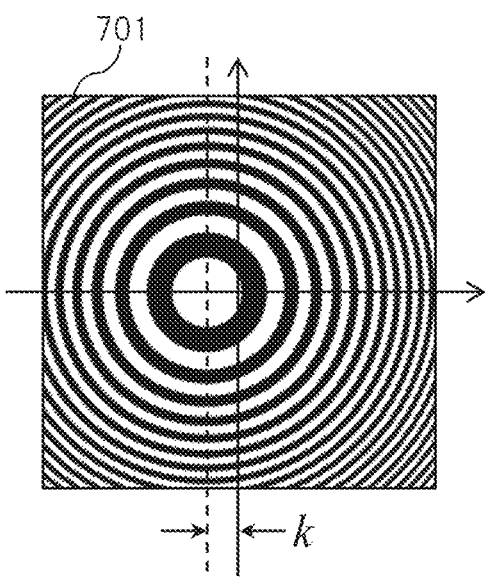
FIG. 7 is a diagram showing a configurational example of a shadow of a real pattern in the first embodiment.

FIG. 7 shows an example of a shadow 701 of this real pattern 105. This shadow 701 shifts by "k" (shifts by a shift amount "k"), and is projected as expressed by the equation 2. This shadow 701 becomes an output of the imaging portion 102.

Figure 8:
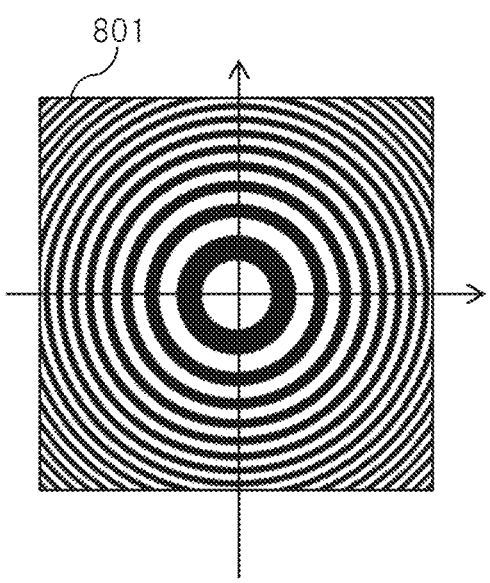
FIG. 8 is a diagram showing a configurational example of a virtual pattern in the first embodiment.

FIG. 8 shows a virtual pattern 801. The virtual pattern 801 in FIG. 8 is an example corresponding to the real pattern 150 in FIG. 5. The imaging processor 107 performs reconstruction while using such a virtual pattern 801.

[Reconstruction (1)]

Next, regarding a process in the imaging processor 107, reconstruction processes based on a correlation reconstruction method and a moire reconstruction method will be explained. Either the reconstruction process based on the correlation reconstruction method or the reconstruction process based on the moire reconstruction method may be used. Alternatively, both methods may be installed, and the methods may be switched if needed.

Figure 9:
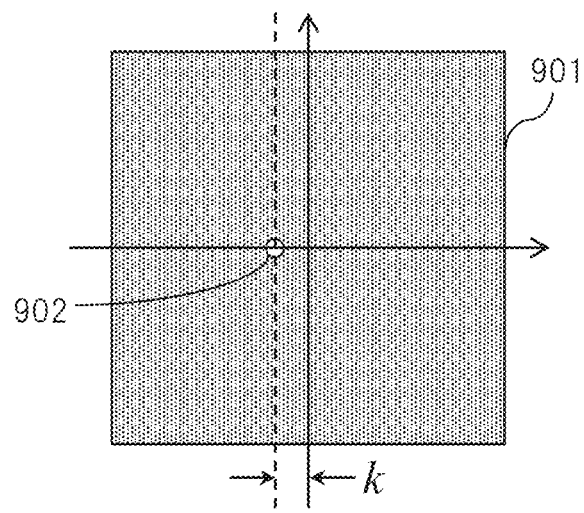
FIG. 9 is a diagram showing a configurational example of a reconstructed image made by a correlation reconstruction method in the first embodiment.

In the correlation reconstruction method, the imaging processor 107 calculates a cross-correlation function between the shadow 701 of the real pattern 105 in FIG. 7 and the virtual pattern 801 in FIG. 8. This manner provides a bright spot 902 having the shift amount "k" as shown in FIG. 9. FIG. 9 shows a configurational example of a reconstructed image 901 based on the correlation reconstruction method.

When the cross-correlation calculation is performed as a two-dimensional convolution calculation, a calculation amount is generally large, and therefore, a principle of a calculation example using Fourier transform will be explained with reference to equations. First, for the virtual pattern 801 in FIG. 8, the Gabor zone plate or the Fresnel zone plate is used as similar to the real pattern 105. Therefore, the virtual pattern 801 can be expressed by the following equation 3 using the initial phase "φ".

[Equation 3]

$$I_B(x) = \cos(\beta x^2 + \Phi) \quad \text{Equation 3:}$$

The virtual pattern 801 is used in an imaging process, and therefore, does not need to be offset at 1 as different from the equation 1, and has no problem when having a negative value. The Fourier transform in the equations 1 and 3 are as shown in the following equations 4 and 5.

[Equation 4]

$$\mathcal{F}[I_F(x)] = \delta(u) + \frac{e^{-iku}}{2\sqrt{\pi\beta}} \sin\left(\frac{u^2}{4\beta} - \Phi + \frac{\pi}{4}\right) \quad \text{Equation 4}$$

[Equation 5]

$$\mathcal{F}[I_B(x)] = \frac{1}{2\sqrt{\pi\beta}} \sin\left(\frac{u^2}{4\beta} - \Phi + \frac{\pi}{4}\right) \quad \text{Equation 5}$$

In the equations, a term "F" represents the calculation of the Fourier transform, a term "u" represents frequency coordinates in the x-axis direction, and a term "δ" with parentheses represents a delta function. What is important in these equations is that the Fourier-transformed equations also show the Gabor zone plate or the Fresnel zone plate. Therefore, the imaging device 1 may directly create and store the Fourier-transformed virtual pattern to be used. In this manner, the calculation amount can be reduced. Next, the following equation 6 is provided by multiplication of the equations 4 and 5.

[Equation 6]

$$\mathcal{F}[I_F(x)] \cdot \mathcal{F}[I_B(x)] = \frac{1}{2\sqrt{\pi\beta}} \sin\left(\frac{\pi}{4} - \Phi\right)\delta(u) + \frac{e^{-iku}}{8\pi\beta} \cdot \left[\sin^2\left(\frac{u^2}{4\beta} - \Phi + \frac{\pi}{4}\right)\right] \quad \text{Equation 6}$$

A term "$e^{-iku}$" expressed by an exponential function of the equation 6 represents a signal component. By the Fourier transform of this term "$e^{-iku}$", this term is transformed as expressed by an equation 7, and the bright spot can be provided at a position shifting by the shift amount "k" in the initial x axis.

[Equation 7]

$$\mathcal{F}^{-1}[e^{-iku}] = 2\pi\delta(x+k) \quad \text{Equation 7:}$$

This bright spot represents light flux at infinite distance, and corresponds to the captured image created by the imaging device 1 in FIG. 1. Note that the correlation reconstruction method may be achieved by a pattern such as a random pattern not limited to the Gabor zone plate or the Fresnel zone plate if a self correlation function of this pattern has a single peak.

[Reconstruction (2)]

Figure 10:
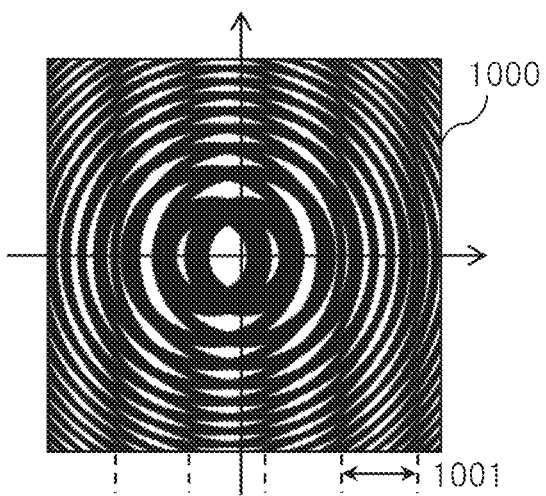
FIG. 10 is a diagram showing a configurational example of a moire stripe made by a moire reconstruction method in the first embodiment.
Figure 11:
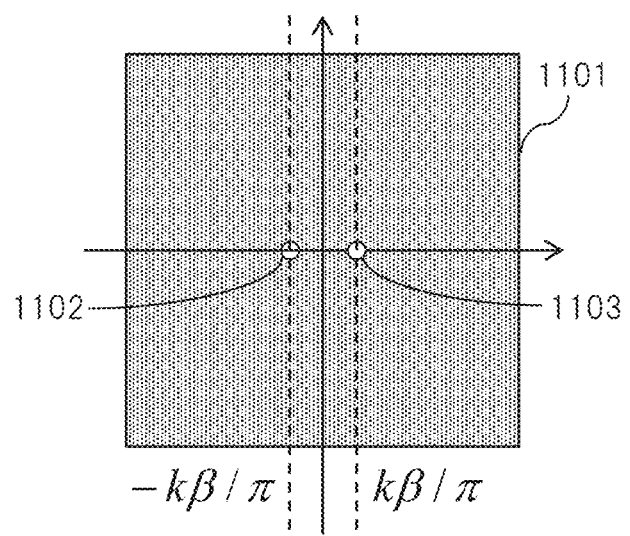
FIG. 11 is a diagram showing a configurational example of a reconstructed image made by a moire reconstruction method in the first embodiment.

Next, in the moire reconstruction method, the imaging processor 107 creates a moire stripe 1000 as shown in FIG. 10 by multiplying the shadow 701 of the real pattern 105 in FIG. 7 and the virtual pattern 801 in FIG. 8. Then, the imaging processor 107 provides bright spots 1102 and 1103 shifting by a shift amount "kβ/π" in a reconstructed image 1101 in FIG. 11 by performing the Fourier transform of this moire stripe 1000. The bright spot 1102 is a bright spot with "−kβ/π", and the bright spot 1103 is a bright spot with "+kβ/π". This moire stripe is expressed by the following equation 8.

[Equation 8]

$$I_F(x) \cdot I_B(x) =$$
$$\{1 + \cos[\beta(x+k)^2 + \Phi]\}\cos(\beta x^2 + \Phi) = \frac{1}{2}[2\cos(\beta x^2 + \Phi) + \cos(2\beta x^2 + 2k\beta x + 2\beta k^2 + 2\Phi) + \cos(2k\beta x + \beta k^2)]$$

Equation 8

The third term in the expanded equation in the equation 8 represents a signal component. It is understood that this signal component creates a stripe pattern such as the moire stripe 1000 in FIG. 10 over a two-pattern overlapping region. In the moire stripe 1000 in FIG. 10, stripe patterns that are linearly extending in a direction (y-axis direction) orthogonal to the two-pattern shift direction (x-axis direction) are formed at an equal interval (interval 1001) in the x-axis direction. A stripe that is created at a relatively low spatial frequency by such overlap between the stripes is called moire stripe. In the example of the first embodiment, the moire stripe is created by the overlap between the real pattern 501 and the virtual pattern 801. The two-dimensional Fourier transform of the third term in the equation 8 is as expressed by the following equation 9.

[Equation 9]

$$\mathcal{F}[\cos 2k\beta x] = \delta\left(u + \frac{k\beta}{\pi}\right) + \delta\left(u - \frac{k\beta}{\pi}\right) \quad \text{Equation 9}$$

In this equation, a term "F" represents the calculation of the Fourier transform, a term "u" represents the frequency coordinates in the x-axis direction, and a term "δ" with parentheses represents the delta function. This result shows that a peak of the spatial frequency in a spatial frequency spectrum of the moire stripe is at a position of "u=±kβ/π". A bright spot corresponding to this peak represents the light flux at infinite distance, and corresponds to the image captured by the imaging device 1 in FIG. 1.

Note that the moire reconstruction method may be achieved by not only the Gabor zone plate or the Fresnel zone plate but a pattern such as an ellipsoidal pattern if the moire stripe resulted from shift of this pattern has a single frequency.

<Noize Cancel>

Noize cancel based on fringe scan or others will be explained below.

[Fringe Scan Process]

The transformations from the equation 6 to the equation 7 and from the equation 8 to the equation 9 have been explained along with the focus on the signal component. However, other terms from the signal component term practically inhibit the reconstruction. Accordingly, a fringe scan processor 106 of the imaging device 1 performs noise cancelling based on fringe scan. For the fringe scan, it is necessary to use a plurality of patterns having different initial phase φ as the real pattern 105.

Figure 12:
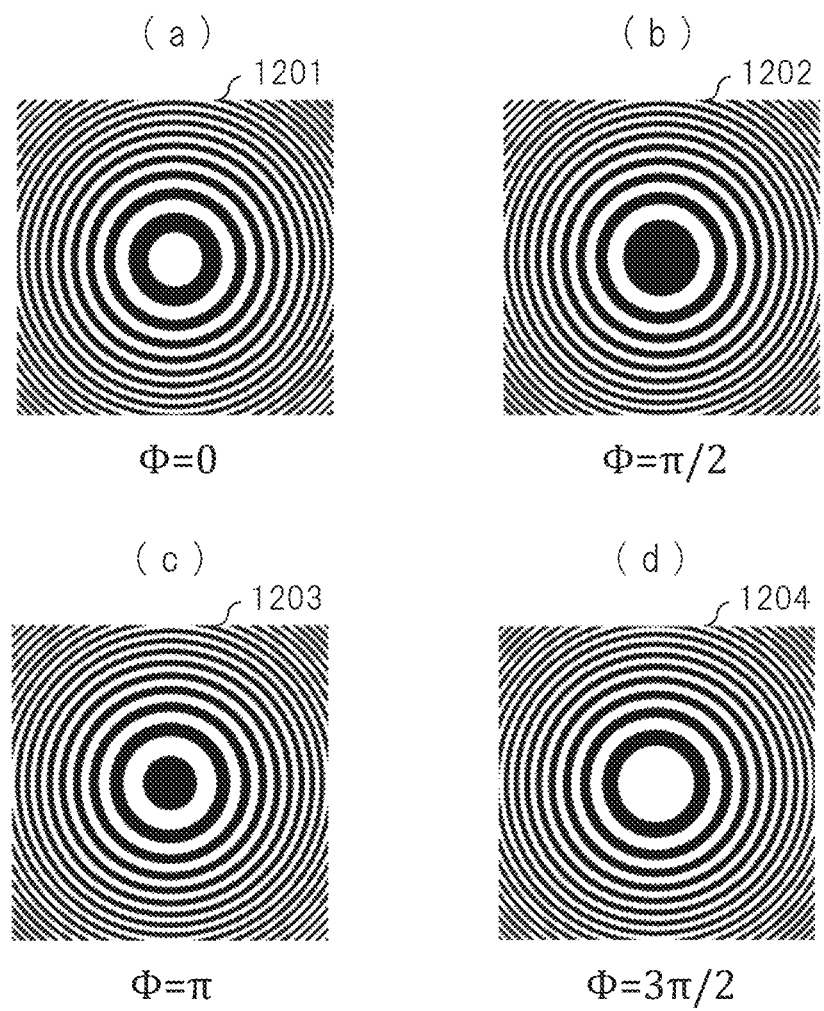
FIG. 12 is a diagram showing a configurational example of combination of a plurality of patterns having a different initial phase in the first embodiment.

FIG. 12 shows a configurational example of combination of the plurality of patterns having different initial phase φ as the real pattern 105 in the fringe scan. FIG. 12 (*a*) to (*d*) show four phase patterns 1201 to 1204 having "φ=0, π/2, π, 3π/2". In this case, in accordance with the following equation 10, the fringe scan processor 106 calculates the sensor image captured along with the usage of these four phases. As a result, a sensor image having a complex number (referred to as complex sensor image in some cases) is provided.

[Equation 10]

$$I_{CF}(x) = \frac{1}{2}\sum_{\Phi} I_F(x) \cdot \exp(i\Phi), \Phi \in \{0, \pi/2, \pi, 3\pi/2\} = \frac{1}{2}\sum_{\Phi}\{1 + \cos[\beta(x+k)^2 + \Phi]\} \cdot \exp(\Phi) = \exp[i\beta(x+k)^2]$$

Equation 10

The virtual pattern 801 having a complex number is expressed by the following equation 11. The virtual pattern 801 has no problem even when having the complex number because of being used in the fringe scan process performed by the fringe scan processor 106.

[Equation 11]

$$I_{CB}(x) = \exp(-i\beta x^2)$$

Equation 11:

In the moire reconstruction method, the following equation 12 is provided by multiplication of the equations 10 and 11. A term "exp(2iβkx)" expressed by an exponential function of the equation 12 represents the signal component. From this signal component, it is understood that the noise canceling process without an unnecessary term as shown in the equation 8 is performed.

[Equation 12]

$$I_{CF}(x) \cdot I_{CB}(x) = \exp[i\beta(x+k)^2] \cdot \exp(-i\beta x^2) = \exp[2i\beta kx + i\beta k^2]$$

Equation 12:

The correlation reconstruction method is similarly reviewed. The Fourier transforms of the equations 10 and 11 are expressed by the following equations 13 and 14.

[Equation 13]

$$\mathcal{F}[I_{CF}(x)] = \frac{1+i}{2\sqrt{2\pi\beta}}\exp(-iku)\exp\left(-i\frac{u^2}{4\beta}\right)$$

Equation 13

[Equation 14]

$$\mathcal{F}[I_{CB}(x)] = -\frac{1+i}{2\sqrt{2\pi\beta}}\exp\left(i\frac{u^2}{4\beta}\right)$$

Equation 14

Next, the following equation 15 is provided by multiplication of the equations 13 and 14. A term "exp(−iku)" expressed by an exponential function of the equation 15 represents the signal component. From this signal component, it is understood that the noise canceling process without an unnecessary term as shown in the equation 8 is performed.

[Equation 15]

$$\mathcal{F}[I_{CF}(x)] \cdot \mathcal{F}[I_{CB}(x)] = \frac{-i}{4\pi\beta}\exp(-iku)$$

Equation 15

The above-described examples have been explained with reference to the four-phase plural patterns. However, the initial phase φ only needs to be designed to equally divide an angle ranging from 0 to 2π, and is not limited to the four phases.

The method for achieving the imaging based on the plural patterns is roughly classified into a method of switching the patterns in time division and a method of switching the patterns in spatial division. Either the method of switching the patterns in time division or the method of switching the patterns in spatial division may be applicable, or a method of installing both methods and using a selected method may be applicable.

In order to achieve the time-division fringe scan for handling the method of switching the patterns in the time division, for example, the plurality of initial phases of FIG. 12 may be electrically switched, and displayable display elements such as liquid crystal display elements may be used as the real pattern 105 in FIG. 1. For example, the fringe scan processor 106 in FIG. 1 controls the switching timing of the liquid crystal display elements showing the real pattern 105 and a shutter timing of the image sensor 103 to be synchronized. In this manner, after acquisition of four images corresponding to the image sensor 103, the imaging device 1 executes the fringe scan calculation in the fringe scan processor 106.

Figure 13:
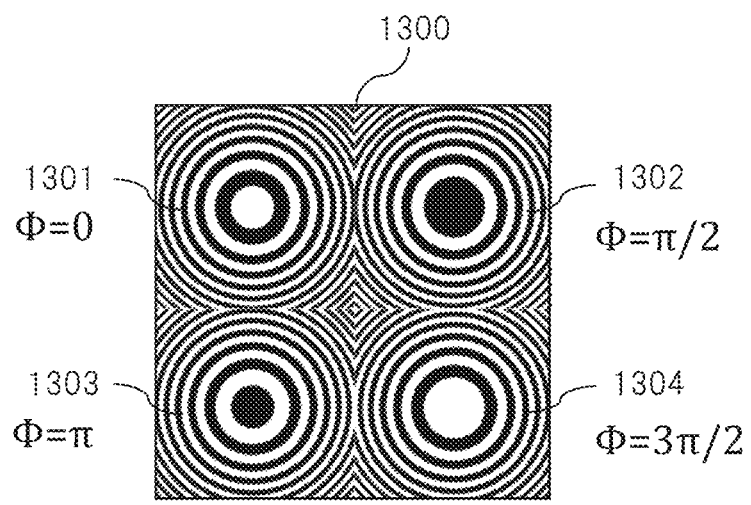
FIG. 13 is a diagram showing a configurational example of a real pattern made by a spatial division method in the first embodiment.

On the other hand, in order to achieve the spatial-division fringe scan for handling the method of switching the patterns in the spatial division, for example, a real pattern 1300 having the plurality of initial phases in the spatial division is used as the real pattern 105 as shown in FIG. 13. The real pattern 1300 in FIG. 13 includes the four-phase patterns in regions 1301 to 1304 resulted from division of the entire quadrangular region into four pieces in the x-axis direction and the y-axis direction.

After the imaging device 1 acquires one image from the image sensor 103, the imaging device 1 divides this image in the fringe scan processor 106 into four pieces corresponding to the respective initial-phase patterns, and executes the fringe scan calculation.

[Fringe Scan Calculation]

Figure 14:
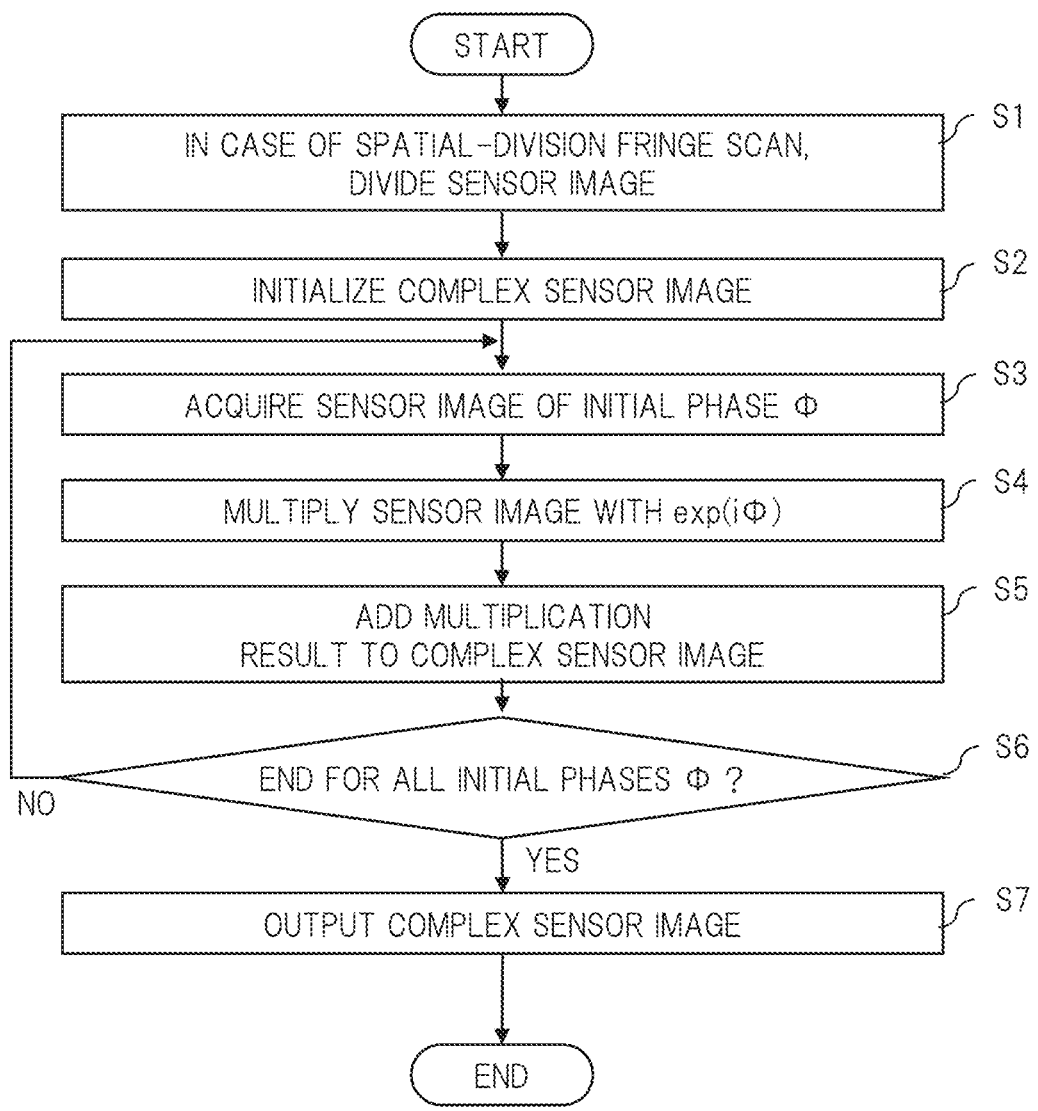
FIG. 14 is a flowchart of a fringe-scan calculating process in the first embodiment.

Next, the fringe scan calculation in the fringe scan processor 160 will be explained. FIG. 14 is a flowchart showing a process outline including the fringe scan calculation in the fringe scan processor 160. FIG. 14 shows steps S1 to S7 that will be explained below in an order of the steps. First, in the step S1, the fringe scan processor 106 acquires the sensor image based on the plurality of patterns out of the image sensor 103. In this case, the fringe scan process 106 divides this sensor image if the spatial-division fringe scan is used, or does not divide it in this step S1 if the time-division fringe scan is used.

Next, in the step S2, the fringe scan processor 106 initializes the complex sensor image to be output. The fringe scan processor 106 acquires the sensor image having the first initial phase φ in the loop in the step S3, multiplies this sensor image with "exp(iφ)" that is the exponential function corresponding to this initial phase φ in the step S4, and adds the multiplication result to the complex sensor image to be output in the step S5.

The fringe scan processor 106 confirms whether the process for all initial phases cp to be used ends or not in the step S6, and similarly repeats the processes of the steps S3 to S5 the number of times corresponding to the number of the initial phases φ to be used. For example, in the fringe scan using the four phases in FIGS. 12 and 13, the processes are repeated four times corresponding to the number of the initial phases "φ=0, π/2, π, and 3π/2".

Lastly, in the step S7, the fringe scan processor 106 outputs the processed complex sensor image. The above-described main processes in the fringe scan processor 106 are equivalent to the above-described equation 10.

[Imaging Process]

Figure 15:
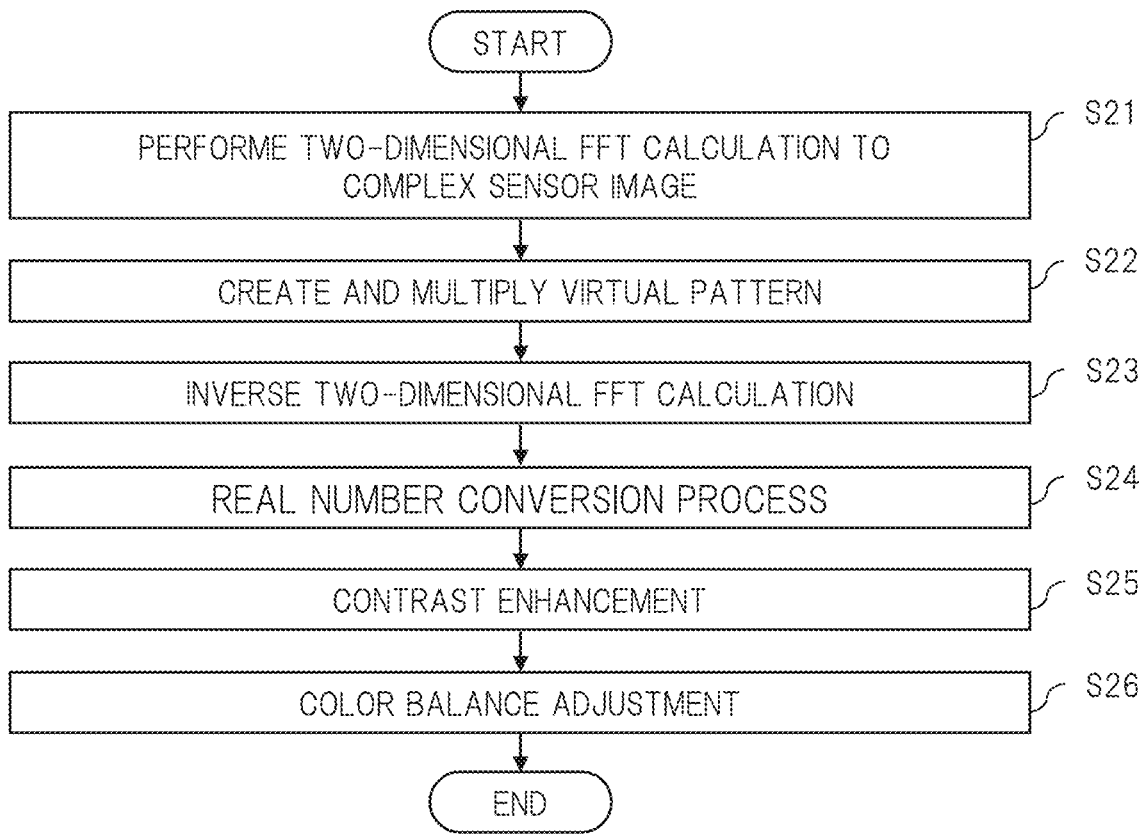
FIG. 15 is a flowchart of an imaging process made by a correlation reconstruction method in the first embodiment.

Next, an imaging process in the imaging processor 107 will be explained. FIG. 15 is a flowchart showing a process outline in the case of usage of the correlation reconstruction method in the imaging processor 107. FIG. 15 shows steps S21 to S26. First, in the step S21, the imaging processor 107 acquires the complex sensor image out of the fringe scan processor 106, and executes the two-dimensional fast Fourier transform (FFT: Fast Fourier Transform) calculation to this complex sensor image.

Next, in the step S22, the imaging processor 107 creates the virtual pattern 801 used for the reconstruction. Alternatively, the imaging processor 107 may refer to the virtual pattern 801 that is previously set and stored in a memory or others. Then, the imaging processor 107 multiplies the two-dimensional FFT calculated complex sensor image with this virtual pattern 801. In the step S24, the imaging processor 107 performs an inverse two-dimensional FFT calculation to the multiplied image.

This calculation result shows a complex number. Therefore, in the step S24, the imaging processor 107 performs a real number conversion process to the complex number that is the calculation result. The real number conversion process is a process for conversion to an absolute value or a process for extraction of a real part. When the complex number is expressed as "C=A+Bi", the process for conversion to an absolute value is expressed as "|A+Bi|=√(A²+B²)". The process for extraction of a real part is expressed as "Re[A+Bi]=A". In this manner, the imaging processor 107 rationalizes the image, and reconstructs it.

Then, the imaging processor 107 performs a contrast enhancement process to the resultant image in the step S25, and adjusts color balance or others in the step S26. The imaging processor 107 outputs data of the process result as the captured image. The imaging process in the imaging processor 107 ends here, and the captured image that is visually recognizable for the user can be provided.

Figure 16:
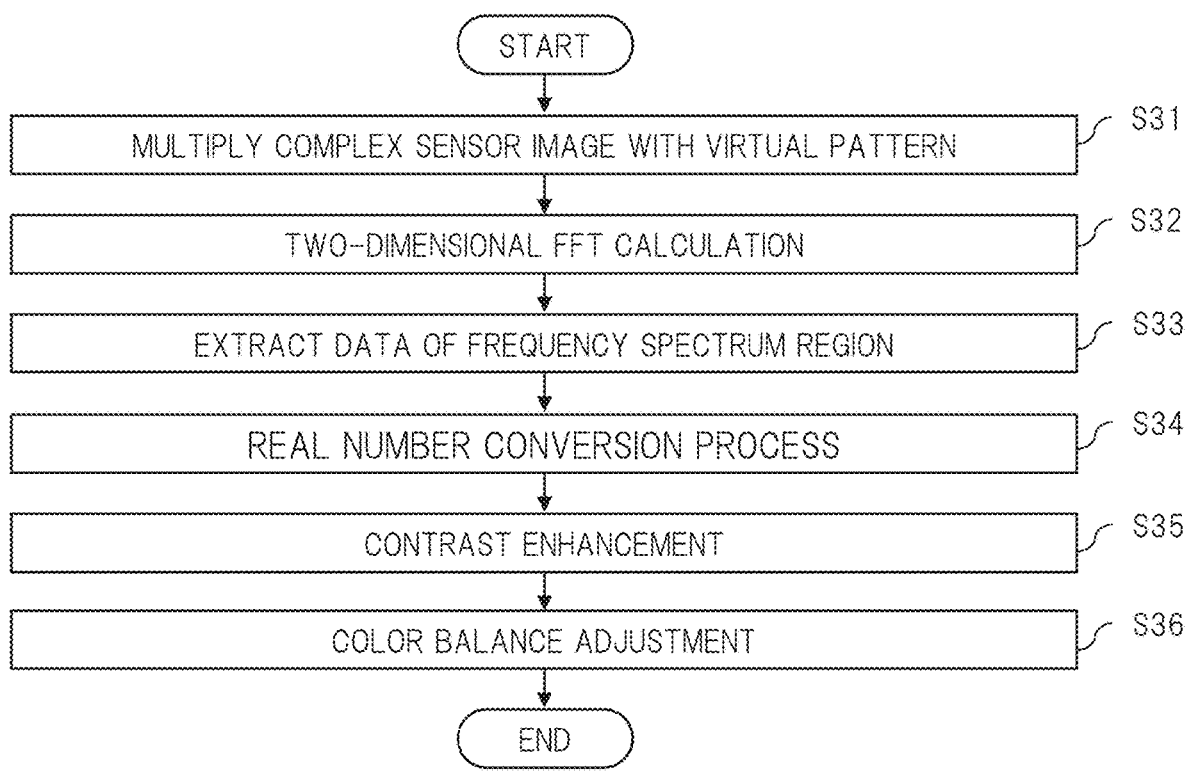
FIG. 16 is a flowchart of an imaging process made by a moire reconstruction method in the first embodiment.

In comparison to the above description, FIG. 16 shows a process outline in the case of the usage of the moire reconstruction method. FIG. 16 shows steps S31 to S36. First, in the step S31, the imaging processor 107 acquires the complex sensor image out of the fringe scan processor 106, creates the virtual pattern 801 used for the reconstruction, and multiplies the complex sensor image with this virtual pattern 801. The imaging processor 107 performs a two-dimensional FFT calculation to the multiplied image to provide a frequency spectrum in the step S32, and extracts data of a necessary frequency region from this frequency spectrum in the step S33. The processes in the subsequent steps S34 to S36 are the same as the processes in the steps S24 to S26 in FIG. 15.

Note that the imaging device 1 is not limited to a camera capturing the image based on the visible light, and can be an imaging device targeting a frequency band of infrared ray or others or an imaging device (referred to as distance image sensor or others in some cases) imaging a distance image to an object (that is an image having three-dimensional distance information in a depth direction).

<Principle of Imaging of Object at Finite Distance>

A principle of imaging of an object at finite distance and others will be explained below.

[Imaging of Object at Infinite Distance and Imaging of Object at Finite Distance]

Figure 17:
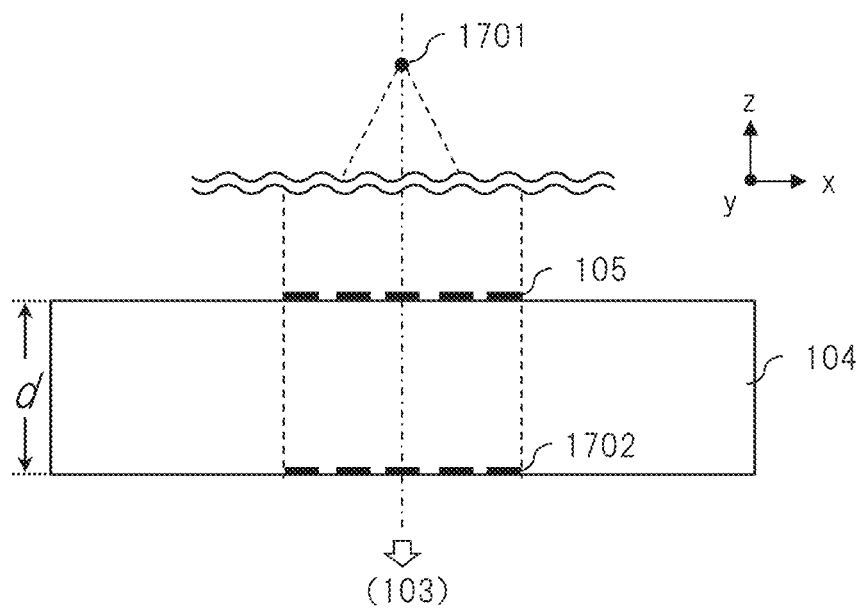
FIG. 17 is a diagram showing shadowing of the real pattern in a case of an object at infinite distance in the first embodiment.

Next, FIG. 17 shows a state of projection of the real pattern 105 to the image sensor 103 in the above-described case of the far object (in other words, the object at infinite distance). A spherical wave from a point 1701 configuring the far object becomes a planar wave while travelling in a sufficiently long distance, and is emitted to the real pattern 105. When a shadow 1702 created by this emission is projected to the image sensor 103, the shadow has almost the same shape as that of the real pattern 105. As a result, a single bright spot can be provided by the reconstruction to the shadow 1702 along with the usage of the virtual pattern.

Figure 18:
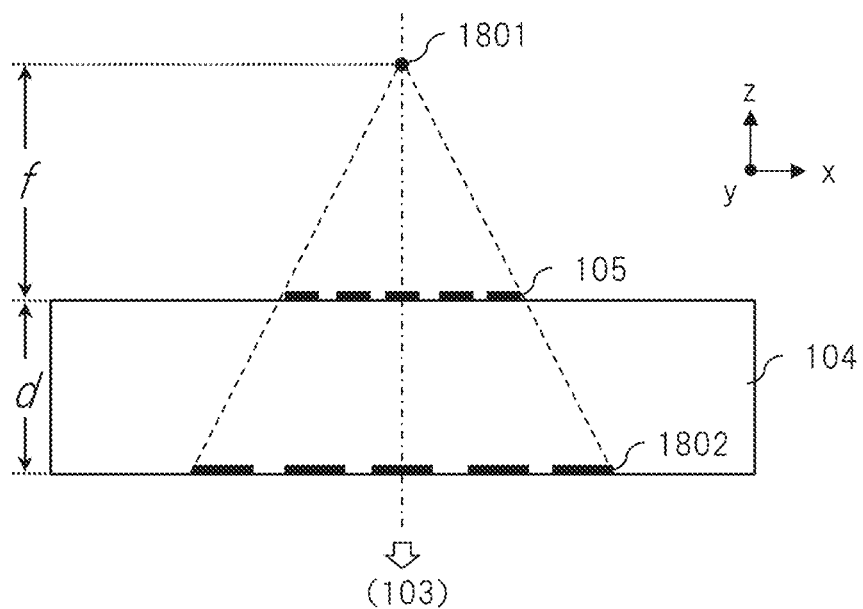
FIG. 18 is a diagram showing enlargement of a real pattern in a case of an object at finite distance in the first embodiment.

On the other hand, the imaging of the object at finite distance for handling a case of a near object will be explained. FIG. 18 is an explanatory diagram in the case of the object to be imaged at finite distance, showing that the shadow of the real pattern 105 on the image sensor 103 is wider than the real pattern 105. A spherical wave from a point 1801 configuring the object is emitted to the real pattern 105, and a shadow 1802 created by this emission is projected to the image sensor 103. In this case, the shadow is almost uniformly expanded. Note that an expansion rate "α" in this case can be calculated by the following equation 16 along with usage of a distance "f" from the real pattern 105 to the point 1801 in the z-axis direction.

[Equation 16]

$$\alpha = \frac{f+d}{f} \qquad \text{Equation 16}$$

Therefore, the reconstruction along with the usage of the virtual pattern that is designed for the collimated light as it is cannot provide the single bright spot. Accordingly, expansion of the virtual pattern 801 to match the uniformly-expanded shadow of the real pattern 105 as shown in FIG. 18 can provide the single bright spot again in the expanded shadow 1802. For this, correction is achieved by changing the coefficient "β" of the virtual pattern 801 into "β/α²". In this manner, the imaging device 1 can selectively reproduce the light on the point 1801 at a distance that is not always infinite. Therefore, the imaging device 1 can perform the imaging to focus on any position.

<Configuration of Image Sensor>

Next, with reference to FIG. 19 and others, a configuration of the image sensor 103 will be explained.

[Image Sensor (1)]

Figure 19:
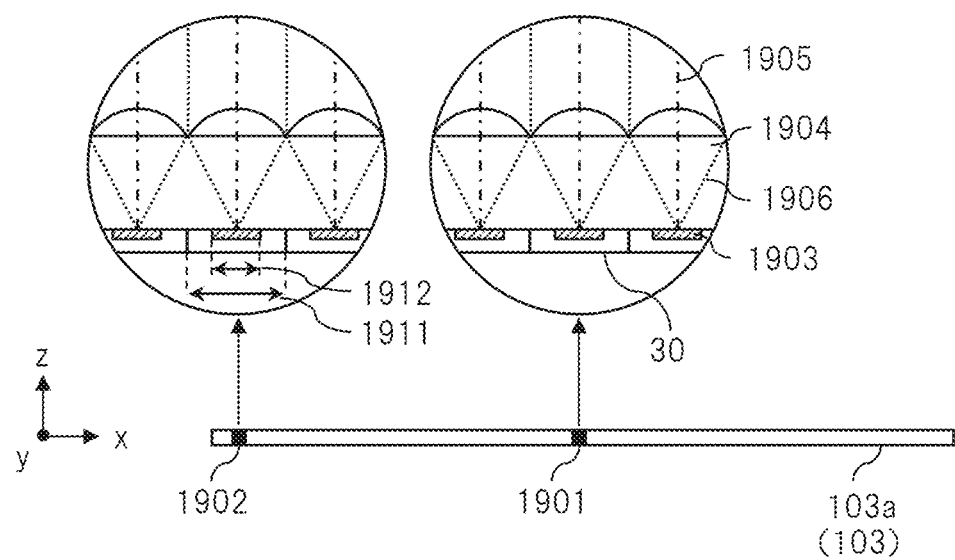
FIG. 19 is a diagram showing a configurational diagram of arrangement of a micro lens and a pixel in an image sensor in a comparison example of the first embodiment.

FIG. 19 shows cross-sectional structures of a center pixel 1901 and an end pixel 1902 of the image sensor 103a (103) in the x-axis direction as a comparison example of the first embodiment. In the explanation, an image sensor made of a general imaging element such as CMOS or CCD is considered. A pixel 30 of this image sensor 103a cannot receive the light on the whole surface but can receive the light only on a light receiver 1903 that is a part of the surface based on a wiring or a mask structure. A width 1912 of the light receiver 1903 is smaller than a width 1911 of the pixel 30.

Therefore, in the general image sensor, micro lenses 1904 are arranged as the micro lens array in front of the light receiver 1903 in the z-axis direction as shown in this image sensor 103a in order to improve the light use efficiency. In this manner, the incident light 1905 illustrated with a dashed dotted line is gathered to be light 1906 illustrated with a dotted line by the micro lenses 1904, and is efficiently taken into the light receiver 1903. Each of the micro lenses 1904 is a lens that is convexly curved on the incident side.

Figure 20:
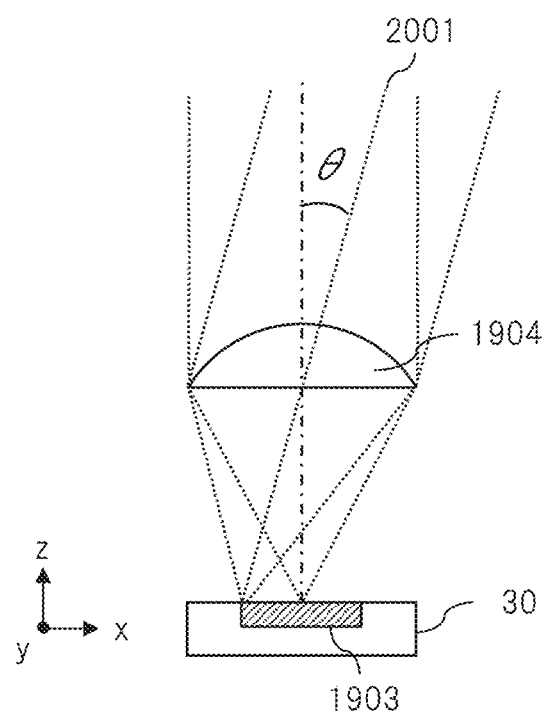
FIG. 20 is an explanatory diagram showing light entering one pixel in a comparison example of the first embodiment.

FIG. 20 shows a state of the light incidence on one pixel 30 in FIG. 19. Since the light receiver 1903 of the image sensor 103a in FIG. 19 is smaller than the pixel 30 as described above, the imaging is possible only in an angle range in which the light is gathered in the light receiver 1903 as shown with a light ray 2001 in FIG. 20. Sensitivity for light emitted from other angles than this angle range is rapidly reduced.

Figure 21:
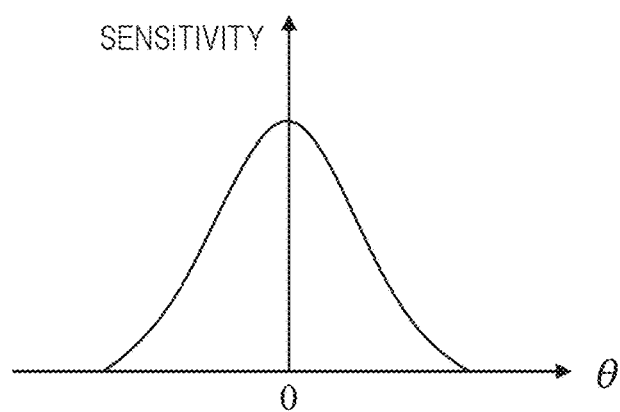
FIG. 21 is a diagram showing an example of a CRA property of a general image sensor.
Figure 22:
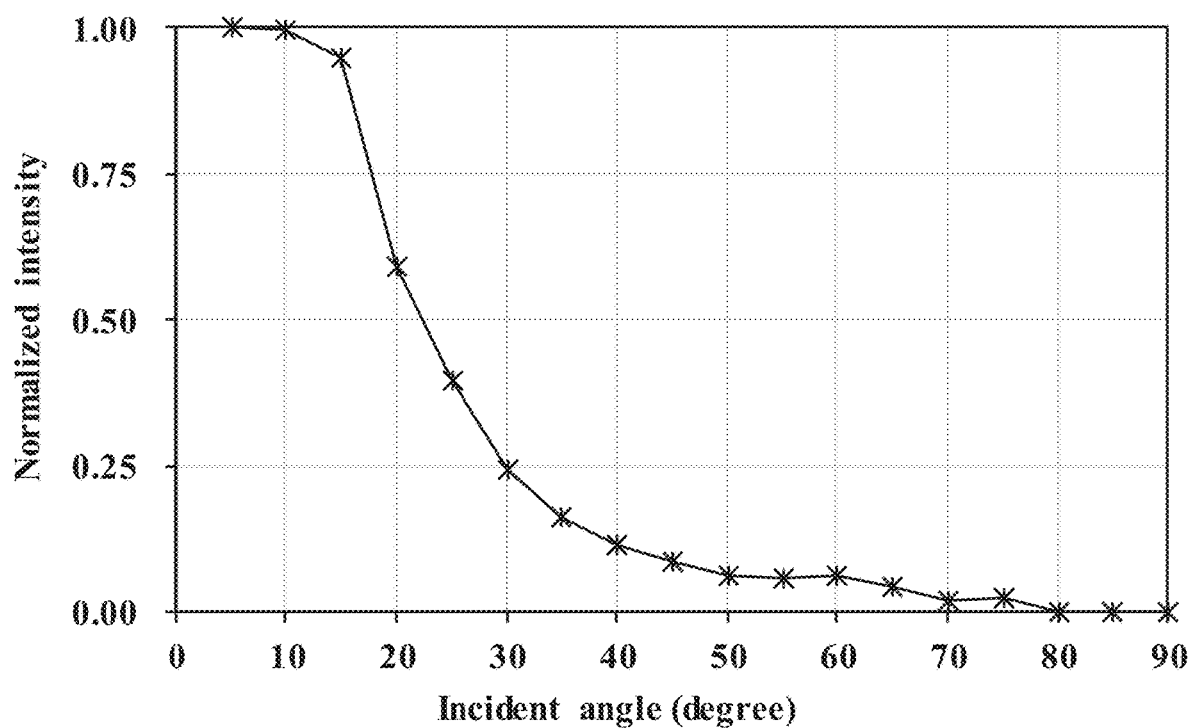
FIG. 22 is a diagram showing an example of practical measurement of the CRA property of the general image sensor.

FIG. 21 shows an example of dependency of the sensitivity to the angle, and FIG. 22 shows an example of practical measurement. Such sensitivity is called Chief Ray Angle (CRA) property. A horizontal axis of a graph in FIG. 21 represents the angle θ, and a vertical axis of the same represents the sensitivity. The sensitivity corresponds to a light receiving amount and a light intensity. A horizontal axis in FIG. 22 represents an incident angle corresponding to the angle θ, and a vertical axis of the same represents a normalized light intensity. If the structure of the image sensor is no problem, the CRA property generally reduces by the fourth power of cos θ. However, if the structure of the image sensor becomes disincentive as described above, the light amount rapidly reduces by an amount that is more than the fourth power of cos θ as shown in FIG. 22.

Figure 23:
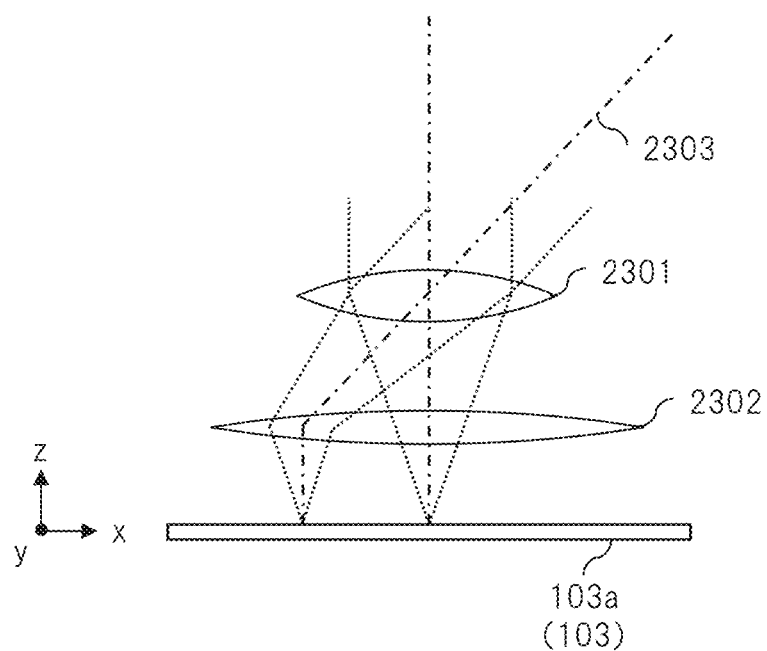
FIG. 23 is a diagram showing an example of an image-side telecentric optical system in a comparison example of the first embodiment.

Therefore, in a comparison example, an image-side telecentric optical system is used in a general camera not being the lensless camera as shown in FIG. 23. In this manner, the light ray is designed to always orthogonally enter the image sensor and to avoid obliquely entering the image sensor (the corresponding pixel). FIG. 23 shows a configurational example of the image-side telecentric optical system in the general camera in the comparison example. In FIG. 23, lenses 2301 and 2302 are arranged in front of the image sensor 103a in the z-axis direction. The lens 2302 is a field lens that is a lens for changing a travelling direction of the light near the object. The incident light ray 2303 that is oblique to the optical axis in the z-axis direction is converted to the light ray travelling in the z-axis direction, that is the collimated light, by the lenses 2301 and 2302.

Figure 24:
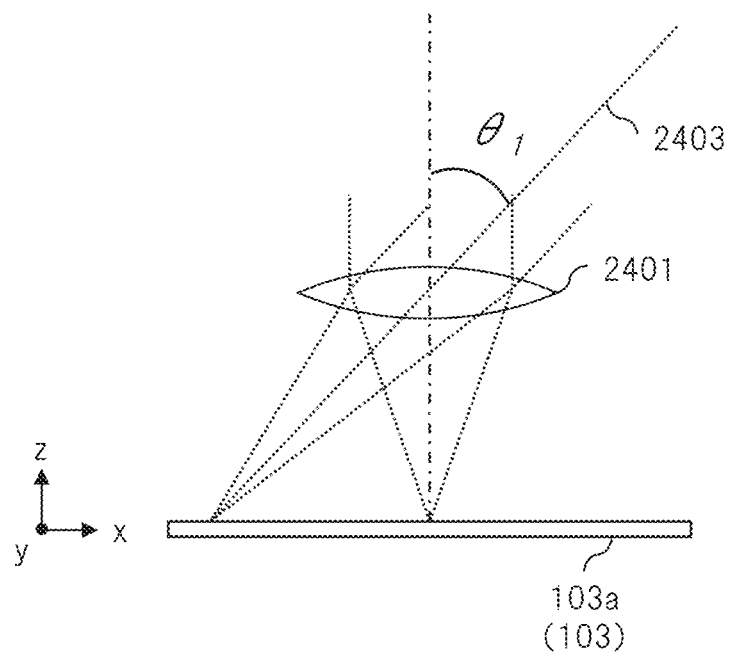
FIG. 24 is a diagram showing an example of a non-telecentric optical system in a comparison example of the first embodiment.

However, as a result of advancement of downsizing and high density observed in apparatuses such as smartphones in recent years, non-telecentric optical systems as shown in FIG. 24 have been used often. FIG. 24 shows a configurational example of the non-telecentric optical system in another general camera as a comparison example. In FIG. 24, a lens 2401 is arranged in front of the image sensor 103a in the z-axis direction. The incident light ray 2403 that is oblique by an angle θ1 to the optical axis in the z-axis direction is received as the oblique light ray by the light receiver even after traveling in the lens 2401. In a case of a camera with a lens as shown in FIG. 24, a pixel property is different depending on the incident angle of the light ray among a plurality of pixels in the plane of the image sensor 103a. The light obliquely enters a pixel at an end, and therefore, the light amount is less, and a dark pixel value is observed.

Figure 25:
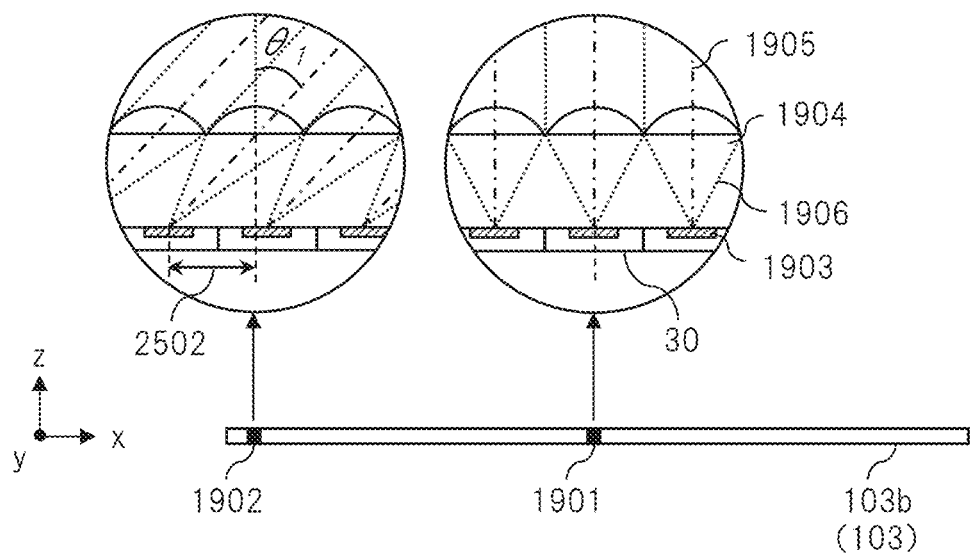
FIG. 25 is a diagram showing a configurational example of arrangement of a micro lens and a pixel in an image sensor in a comparison example of the first embodiment.

In recent cameras, a configuration as shown in FIG. 25 fitting with such a property of the non-telecentric optical system is a mainstream. As a comparison example of the first embodiment, FIG. 25 shows a configurational example of arrangement of the pixel 30 of an image sensor 103b (103) and a micro lens 1904. In the configuration of FIG. 25, an optical axis of the micro lens 1904 of the image sensor 103 and an optical axis of the light receiver 1903 purposely shift to be different from each other. If it is desirable to equalize the light amount on each pixel 30 in the plane of the image sensor 103 in this configuration, the light ray is corrected by a relative positional relation with the micro lens 1904 to be set to the end pixel 1902. In this configuration, the relation between the micro lens 1904 and the light receiver 1903 is different between the center pixel 1901 and the end pixel 1902 of the image sensor 103 in the x-axis direction. This image sensor 103b is configured to change the relative position between the micro lens 1904 and the light receiver 1903, and to monotonously increase or decrease a relative-position difference amount. At the center pixel 1901, the optical axis of the micro lens 1904 and the optical axis of the light receiver 1903 match each other. At the end pixel 1902, there is a distance 2502 in the difference between the optical axis of the micro lens 1904 and the optical axis of the light receiver 1903. Also at an opposite end pixel, there is a distance in difference in an opposite direction although not illustrated. Therefore, this image sensor 103b has an imaging system in which attenuation of the light amount reduction near the image is small. Cameras having the configuration as shown in FIG. 25 have been already inexpensively achieved.

Figure 26:
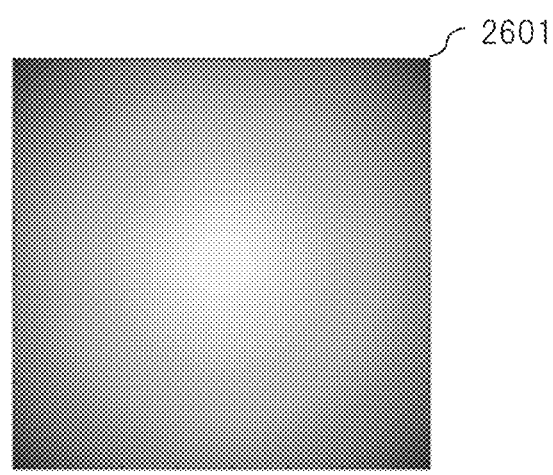
FIG. 26 is a diagram showing a shading example of a sensor image in a comparison example of the first embodiment.

However, the lensless optical system does not have the lens as shown in FIG. 24, and the light from the point 1701 creates the shadow 1702 that is almost the collimated light at an outgoing position from the pattern substrate 104, and is uniformly emitted to the image sensor 103. Basically, the light ray orthogonally enters each pixel in the plane of the image sensor 103, and the light amounts of the respective pixels are almost the same. In this case, when the image sensor 103b that is the type as shown in FIG. 25 is used, shading is strongly observed in a sensor image corresponding to the captured image signal as shown in FIG. 26. In other words, a peripheral part of the sensor image is darkened. FIG. 26 shows an example of a sensor image 2601 with the shading in the case of the usage of the image sensor 103b. Under the occurrence of such shading, noises having a low frequency are strongly observed in the course of the later-stage reconstruction, and therefore, the reconstructed image is deteriorated.

Therefore, for the lensless optical system, not the configuration of the image sensor 103b as shown in FIG. 25 but the configuration with the uniform relation between the light receiver 1903 and the micro lens 1904 as shown in the image sensor 103a of the type in FIG. 19 is desirable in order to avoid the deterioration of the image. However, under the application of this configuration, the CRA property depending on the pixel structure is a problem as shown in FIGS. 21 and 22, and a field of view (a corresponding angle range of view) of the camera is narrowed.

[Image Sensor (2)]

Accordingly, a system for solving the problems of the shading and the CRA property in the imaging device 1 of the first embodiment will be explained. The purpose of the first embodiment is to achieve both of the suppression of the image deterioration and the wide angle range of view. FIG. 27(A) shows top views of one pixel 30 and the micro lens 1904 in FIG. 20. In the case of FIG. 27(A), there is no relative positional difference between the micro lens 1904 and the light receiver 1903. On the other hand, FIG. 27(B) shows a case with the relative positional difference between the micro lens 1904 and the light receiver 1903. The relative positional difference is expressed as a difference (Δ) 2701 using vectors. When there is the relative positional difference 2701 as shown in FIG. 27(B), the difference is regarded to be divided into a difference "Δx" in the x-axis direction and a difference "Δy" in the y-axis direction.

In this case, FIG. 28 shows a relation between a position of the pixel 30 and the difference "Δx" in the x-axis direction in the configuration of the image sensor 103$b$ in FIG. 25. FIG. 28(A) shows a distribution property of the difference Δx, and FIG. 28(B) shows a graph resulted from differentiation of the property of FIG. 28(A). In FIG. 28(A), regarding the pixel 30 at each position in the x-axis direction, a center position is represented by a position "L1", a right end position that is in a positive direction is represented by a position "L2", and a left end position that is in a negative direction is represented by a position "L3". As seen in the drawing, at the center position L1 of the image sensor 103$b$, there is no difference Δx, that is, 0. At the right end position L2, there is the difference Δx in the positive direction (+Δ×1). At the left end position L3, there is the difference Δx in the negative direction (−Δ×1). In FIG. 28(A), the change of the relative positional difference is monotonous increase change. In FIG. 28(B), a value of the difference between the adjacent pixels that is the change amount of the difference Δx is constant. Note that FIG. 28(A) shows the linearly changing difference Δx. However, the present invention is not limited to this configuration, and a curved change expressed by a quadratic function or others is also applicable.

This configuration of the image sensor 103$b$ is achieved by designing a pitch of the micro lens 1904 and a pitch of the pixel 30 to be almost equal to each other and relatively shifting, that is, changing the pitches to have a difference of one pixel or smaller between the center and the end of the image sensor 130$b$.

Figure 29:
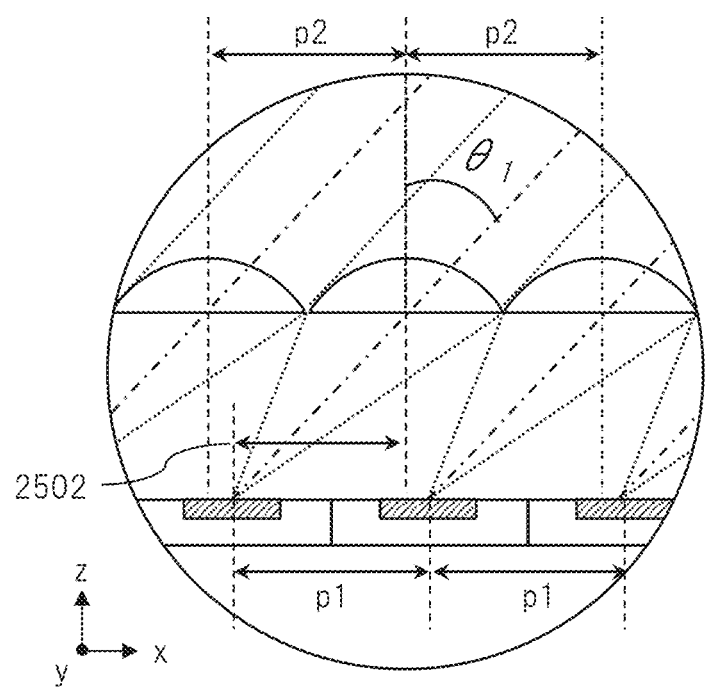
FIG. 29 is a diagram showing an example of a pitch between the pixels, a pitch between the micro lenses and others.

FIG. 29 shows a pitch "p1" between the pixels 30 and between the light receivers 1903, a pitch "p2" between the micro lenses 1904, a relative positional difference 2502 and others for explanation about the configuration of the image sensor 103$b$. FIG. 29 shows an example of the left end pixel 1902 in FIG. 25. The pitch p1 and the pitch p2 are almost equal to each other. Regarding the relative positional difference 2502, a center position of the micro lens 1904 with respect to a center position of the pixel 30 and the positive direction in the x-axis direction (that is a direction from left to right in the drawing) are illustrated as reference. For example, the pitch p2 between the micro lenses 1904 at the center pixel 1901 in FIG. 25 is represented by a pitch "p21", and the pitch p2 between the micro lenses 1904 at the left end pixel 1902 is represented by a pitch "p22". The above-described configuration is designed to have, for example, a relation of "p21>p22", and the pitches p2 between the micro lenses 1904 from the center to the end shift to be reduced from the pitch p21 to the pitch p22. Besides, in this configuration, the change of the relative positional difference between the pixel 30 and the micro lens 1904 is designed to be one pixel or smaller.

Figure 30:
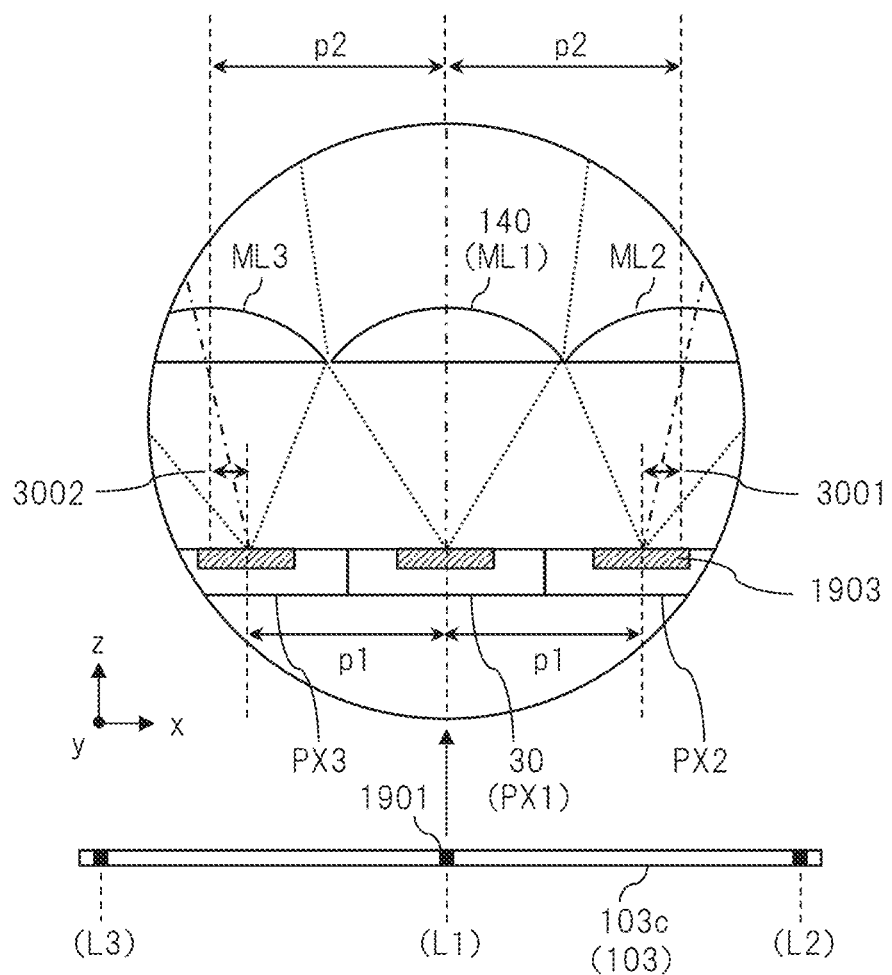
FIG. 30 is a diagram showing a configurational example of arrangement of a micro lens and a pixel in an image sensor in the first embodiment.

On the other hand, FIG. 30 shows a configurational example of an image sensor 103$c$ (103) in the imaging device 1 of the first embodiment. In FIG. 30, a configurational example of a pixel 30 and a micro lens 140 at the center position L1 in the plane of the image sensor 103 is illustrated to be enlarged. In this configuration, the pitch p2 between the micro lenses 1904 is larger than the pitch p1 between the pixels 30 (p1<p2). The center pixel 30 is represented by a pixel "PX1", and pixels on both sides of this pixel are represented by "PX2" and "PX3". The micro lenses 140 corresponding to these pixels are represented by micro lenses "ML1", "ML2" and "ML3", respectively. At the center pixel PX1, the relative positional difference Δx from the micro lens ML1 is 0. At the right pixel PX2, the relative positional difference Δx (3001) from the micro lens ML2 is a value that is larger than 0 in the positive direction. At the left pixel PX3, the relative positional difference Δx (3002) from the micro lens ML3 is a value that is larger than 0 in the negative direction. The change in the relative positional difference becomes larger when the position is closer from the center to the outer end in the plane.

In the case of the large difference between the pitch p2 of the micro lens 140 and the pitch p1 of the pixel 30 as shown in FIG. 30, in other words, in the case of the certain difference (p2−p1) or larger between the pitch p1 and the pitch p2, the relative positional difference (Δx, Δy) in the plane rapidly changes. When the relative positional difference between the adjacent pixels 30 is larger than one pixel in accordance with the difference design (p2−p1), a point changing from positive to negative or from negative to positive occurs. The larger the difference (p2−p1) is, the larger the number of such points is. As described above, in the first embodiment, for example, since the pitch p1 and the pitch p2 are largely made different from each other, the relative positional difference changes in the plane of the image sensor 103 to provide various values. This manner provides an effect of the improvement of the camera properties as described later.

To put it in extreme words, the image sensor 103 in the first embodiment may be configured so that the relative position between the pixel 30 and the micro lens 140 shifts/changes at random in the plane as shown in FIG. 31. A schematic graph in FIG. 31(A) shows the distribution property of the relative positional difference amount of the image sensor 103 in the first embodiment. A horizontal axis of the graph represents, for example, the pixel 30 at each position in the x-axis direction, and a vertical axis of the same represents the relative positional difference Δx between a center position of the pixel 30 and a center position of the micro lens 140. In FIG. 31(A), the difference Δx has random values ranging from −Δ×1 to +Δ×1. FIG. 31(B) shows a schematic graph resulted from differentiation of the property of FIG. 31(A), the graph taking the difference value between the adjacent pixels as the change amount of the relative positional difference. As shown in FIG. 31(B), in the first embodiment, the difference value of the relative positional difference amount also has the random distribution. This property shows a point at which the difference value that is the change of the difference amount between the adjacent pixels changes from a positive value to a negative value or a point at which the difference value changes from a negative value to a positive value. Such a random property is achieved by a configuration or others designed to, for example, make the random of at least either one of the pitch p1 of the pixels 30 and the pitch p2 of the micro lens 140 in accordance with a position in the plane.

Figure 32:
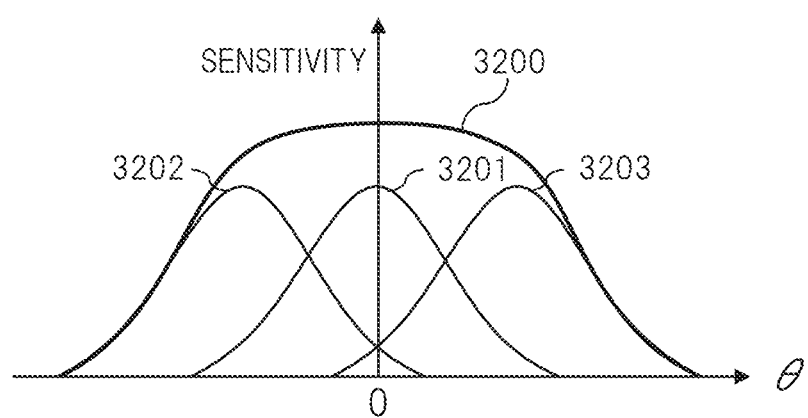
FIG. 32 is a diagram showing an example of a CRA property in the entire image sensor in the first embodiment.

The configuration as shown in FIGS. 30 and 31 is a configuration including various relative positional differences in the plane of the image sensor 103, that is a configuration including the pixels 30 corresponding to the receptions of the light ray at various incident angles. By the configuration as shown in FIGS. 30 and 31, the CRA property as shown in FIG. 32 is achieved. FIG. 32 shows an example of the entire CRA property of the image sensor 103 in the first embodiment. A CRA property 3200 in FIG. 32 is a variously-combined property including a CRA property 3201, a peak of which is on the incident light ray in an orthogonal direction (z-axis direction) to the image sensor 103, and CRA properties 3202 and 3203, each peak of which is on the oblique incident light ray and others. The entire image sensor 103 is configured to have sensitivity to light with a wide incident angle as shown in the CRA property 3200.

However, for example, pixels having a sensitivity to the incident light ray in the orthogonal direction to the image sensor 103 and pixels not having or having a low sensitivity thereto exist, and therefore, an image with missing some pieces is adversely created as the sensor image. In a case of a system of forming the image on the image sensor such as a general camera, this is a problem because of pixel defect. On the other hand, in the case of the lensless imaging device including the lensless optical system as described in the first embodiment, the information of the incident light from certain points entirely diffuses in the plurality of pixels 30 of the image sensor 103 (the corresponding sensor image). Therefore, even if the defect exists in the sensor image, the information (the corresponding image) can be restored by the process. In accordance with such properties and such configurations of the random relative positional difference of the lensless imaging device, the imaging device 1 of the first embodiment can perform the reconstruction while suppressing the image quality deterioration.

Figure 33:
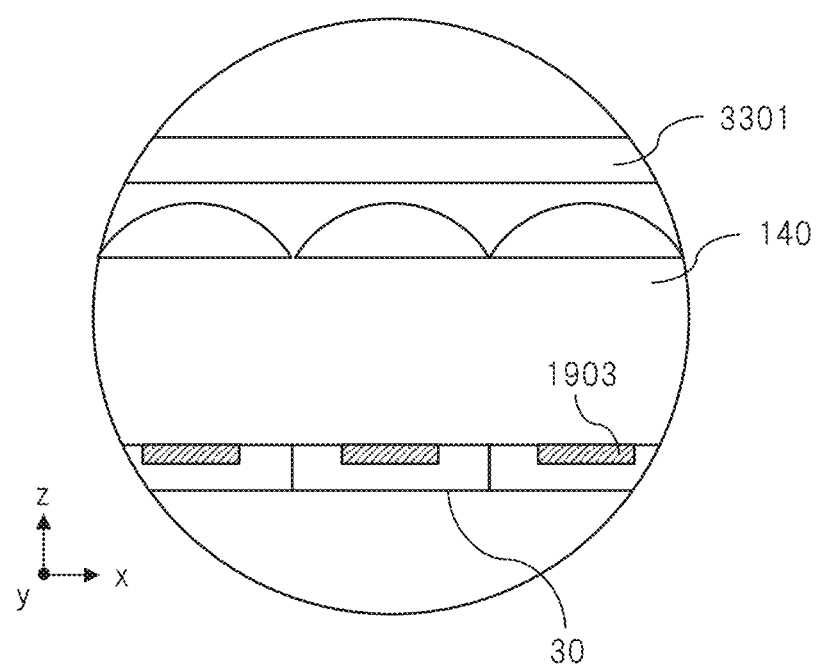
FIG. 33 is a diagram showing a configurational example of arrangement of a micro lens and a pixel in a modification example of the first embodiment.

In order to achieve the effect as described above, it is only necessary to randomly change, for example, the relative position between the light receiver 1903 and the micro lens 140. Therefore, the same effect can be provided by not only the configuration as shown in FIG. 31 but also the configurational example as shown in FIG. 33. The configuration in FIG. 33 is a configuration as a modification example of the first embodiment in which an optical element such as a scattering member 3301 randomly scattering the light is inserted. In the configuration in FIG. 33, the scattering member 3301 is arranged on the incident side of the micro lens 140 in the z-axis direction. The configuration in FIG. 33 does not have the distribution of the relative positional difference between the pixel 30 and the micro lens 140 in the image sensor 103. As another configuration, the scattering member 3301 may be arranged in addition to the configuration having the distribution of the relative positional difference in the image sensor 103.

As described above, the imaging device 1 and the imaging method of the first embodiment provide the configuration having the random change of the relative positional difference between the light receiver 1903 and the micro lens 140 in the plane of the image sensor 103, in other words, the configuration having the distribution of various relative positional differences. This manner can provide the property, the structure, the processing method and others of the image sensor 103 that are suitable for the imaging, and can achieve the lensless imaging device having the wide angle of view of the imaging, not generating the noises due to the shading but generating the high image quality and improving the camera property. Further, according to the configuration of the first embodiment, the existing inexpensive image sensor can be used as image sensor 103, and therefore, the manufacturing cost can be also suppressed.

Second Embodiment

With reference to FIG. 34 and subsequent drawings, an imaging device and an imaging method of the second embodiment will be explained. Configurational parts of the second embodiment that are different from those of the first embodiment will be explained below.

[Missing Pieces of Sensor Image]

In the arrangement of the configuration of the imaging device 1 of the first embodiment, for example, the relative position between the light receiver 1903 and the micro lens 140 in the image sensor 103 randomly changes. This configuration has a possibility of the random occurrence of the missing pieces of the sensor image when the object is imaged at a certain angle, which results in the influence of the random missing pieces on the image quality of the reconstructed image. Accordingly, in the second embodiment, devised configuration, processing method and others will be explained in consideration of this possibility.

Even in the imaging device 1 of the second embodiment, the CRA property of the entire lensless optical system is improved by the configuration having the change of the relative positional difference between the light receiver and the micro lens in the plane of the image sensor 103. However, the second embodiment does not provide the random arrangement as described in the first embodiment, but provides arrangement with the previously-known relative positional difference amount and distribution property such as periodic arrangement. In this manner, as the process performed in the second embodiment, the sensor image captured by the image sensor 103 is divided for each angle corresponding to the incident angle of the light ray.

[Image Sensor]

FIG. 34 shows a configurational example of the periodic arrangement of the relative positional difference in the image sensor 103 of the imaging device 1 of the second embodiment. FIG. 34(A) shows the distribution property of the relative positional difference amount of the image sensor 103 of the second embodiment, the distribution property being periodic as shown in the drawing. A horizontal axis of FIG. 34(A) represents, for example, the pixel 30 at each position in the x-axis direction, and a vertical axis of the same represents the relative positional difference Δx between the light receiver 1903 and the micro lens 140. The difference Δx periodically varies depending on the pixel position in the x-axis direction in a range from −Δx1 to +Δx1. For example, the difference Δx at a center position L1 is "−Δx1", and the difference Δx at a position 3402 that shifts in a right direction from the position L1 by a predetermined pixel distance is "+Δx1". In a region 3401 from the position L1 to the position 3402, the difference Δx linearly increases from "−Δx1" to "+Δx1". In a right region 3403 that shifts in the right direction from the position 3402 by the same pixel distance, the difference Δx linearly increases as similar to the region 3401. FIG. 34(B) shows a graph resulted from differentiation of the property of FIG. 34(A), the graph taking the difference value between the adjacent pixels 30 as the change amount of the relative positional difference amount. As shown in the FIG. 34(B), in the second embodiment, the difference values of the relative positional difference amount includes a portion having a certain positive value and a plurality of portions each having largely changing from a positive value to a negative value or from a negative value to a positive value. The property of the first embodiment in FIG. 31 and the property of the second embodiment in FIG. 34 are different from the monotonous increase or monotonous decrease property of the comparison example in FIG. 28, and include a portion having the difference value of the relative positional difference amount changing from a positive value to a negative value or from a negative value to a positive value. The property of the imaging device 1 as shown in FIG. 34 is already known, and is used for the process in the imaging processor 107 or others.

Figure 35:
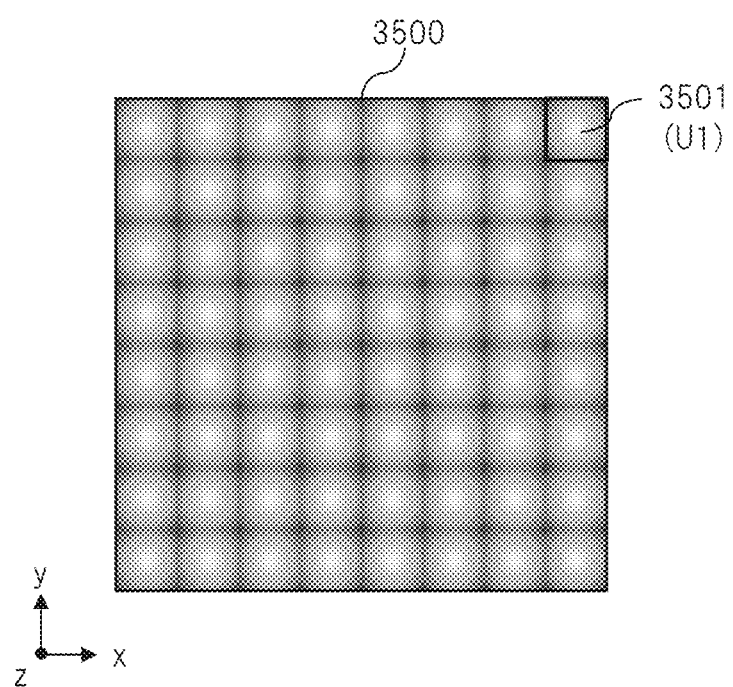
FIG. 35 is a diagram showing an example of a shading of a sensor image in the second embodiment.

On the image sensor 103 having the arrangement of the periodic change of the relative position between the pixel 30 and the micro lens 1904 as described above, the incident light ray in the orthogonal direction (z-axis direction) to the image sensor 103 creates an image as shown in FIG. 35. FIG. 35 shows an example of a sensor image 3500 captured by the image sensor 103 and having the shading. The sensor image 3500 (the corresponding image sensor 103) includes a plurality of regions 3501 on an x-axis/y-axis plane. One of the regions 3501 is a region corresponding to one period (that is a portion such as the region 3401 in FIG. 34) of the change of the relative positional difference, and this one-period region is defined as one unit. Therefore, the relative positional difference Δx of this unit is as shown in FIG. 36.

[Process Dividing Method (1)]

FIG. 36 shows an example of a process dividing method for the relative positional difference of the unit. A horizontal axis of a graph of FIG. 36(A) represents a position of the pixel 30 of one unit in the x-axis direction, and a vertical axis of the same represents the relative position difference Δx. A center of one unit is represented by "M1", a right end is represented by "M2", and a left end is represented by "M3". In the imaging device 1 of the second embodiment, a plurality of units of all regions of the sensor image (the corresponding image sensor 103) are divided into a plurality of regions such as regions A1 to A5 for each interval 3601 of a certain relative positional difference amount. In this example, the units are divided into five regions (A1 to A5) within a range from the minimum value (−Δx1) of the difference amount to the maximum value (+Δx1) of the same. The larger the number of divisions is, the more the image quality is improved. The interval 3601 and the number of divisions are designed values, and are changeable. Similarly, as shown in FIG. 36(B), also for the relative positional difference amount Δy of the unit in the y-axis direction, the units are divided into a plurality of regions such as regions B1 to B5 for each interval 3602. The image processor 107 performs such a division process to the sensor image.

Regarding the division of FIG. 36, mapping of one unit (such as a unit "U1") as shown in the region 3501 is as shown in FIG. 37. FIG. 37 (A) shows a configurational example of the division in one unit. A smaller region than the unit is made by crossing of each region in the x-axis direction and each region in the y-axis direction. For example, a region 3701 is a region of "A1-B1", and a region 3702 is a region of "A5-B5". As the divided sensor image, the image processor 107 creates images that are classified and gathered for each same-type region in the plurality of units of the sensor image 3500 of FIG. 35. For example, divided sensor images are created to have "5×5=25" types that are a divided sensor image (referred to as "G11") created by gathering of only the "A1-B1" regions 3701 to a divided sensor image (referred to as "G55") created by gathering of only the "A5-B5" regions 3702.

The image processor 107 executes the reconstruction shown in FIGS. 15 and 16 as described above for each created divided sensor image of the plurality of divided sensor images by using the corresponding reconstruction pattern. Then, the image processor 107 synthesizes the reconstruction results of the respective divided sensor images into one image. By such a process dividing method, each divided sensor image can be processed without the pixel missing. Therefore, the image process is enabled without the increase in the noises, the information can be restored in the synthesized image, and the deterioration of the image quality can be suppressed.

In the example, note that the process method of dividing each unit into 5×5 regions has been described. However, the present invention is not limited to this process method. FIG. 38(B) shows a process example of dividing the unit only in the x-axis direction, and FIG. 38(C) shows a process example of dividing the unit only in the y-axis direction. In these manners, an optimal design such as the process with the change in the direction is possible in accordance with the property of the image sensor.

In the above description, the configurational example having the periodic relative positional difference Δx as shown in FIG. 34 has been explained. In such a periodic design, the PSF (Point Spread Function) of the reconstructed image has a plurality of peaks as shown in FIG. 38(A), and ghost phenomenon is possibly observed in the reconstructed image. FIG. 38(A) shows an example of the PSF of the reconstructed image. For example, the maximum peak 3800 represents an original point, but a peak 3801 represents the ghost point.

[Process Dividing Method (2)]

Figure 39:
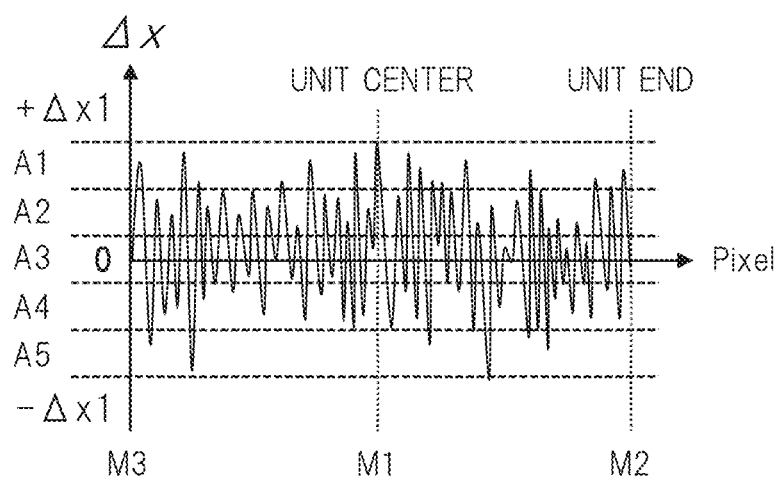
FIG. 39 is a diagram showing a relative positional difference and a process dividing method in a modification example of the second embodiment.

Accordingly, as a modification example of the second embodiment, the following configuration may be applicable. In the modification example, while the relative positional difference of the image sensor 103 is randomly arranged as similar to the first embodiment, the random arrangement is a previously-known design. In other words, in the imaging device 1, the relative positional difference included in each pixel 30 is previously known. In the modification example, as shown in FIG. 39, the divided region is assigned for each unit in accordance with the relative positional difference amount. FIG. 39 shows a process dividing method for the relative positional difference in the modification example. For example, regarding the relative positional difference Δx in the x-axis direction, the regions A1 to A5 corresponding to the difference amount are assigned. The image processor 107 creates the divided sensor image corresponding to the region as similar to the second embodiment, and performs the process to each divided sensor image.

FIG. 38(B) shows an example of the PSF of the reconstructed image resulted from the image process of the modification example. It is found that a peak of FIG. 38(A) based on periodicity such as a peak 3801 is suppressed as shown in a peak 3802 of FIG. 38(B) by the configuration of the modification example.

As described above, the second embodiment provides the configuration having the periodic change of the relative positional difference in the plane of the image sensor 103, and correspondingly provides the configuration in which the sensor image is divided and processed into the plurality of regions. This manner can achieve the lensless imaging device having the wide angle of view of the imaging, and not generating the noises based on the shading but generating the high image quality. Note that the periodic distribution property of the relative positional difference in the image sensor 103 is not limited to the above-described examples, and may be defined by a different periodic function such as a sine function.

In the foregoing, the present invention has been concretely described on the basis of the embodiments. However, the present invention is not limited to the foregoing embodiments, and various modifications can be made within the scope of the present invention. In the present invention, for example, elements can be added to, eliminated from, replaced with, or combined with all elements of the embodiment. In the present invention, combination of one example and another example may be also applicable. Each element (such as the controller 108, the image processor 107 the fringe scan processor 106 and others in FIG. 1) of the present invention may be made of a hardware such as an integrated circuit or FPGA, or a software program process or others. In the case of the program process, the functionality is achieved when, for example, a processor using a CPU, a ROM, a RAM or others executes a process in accordance with a program while using a memory or others. The programs and related data and information may be stored in a storage device or a record medium such as an HDD, a DVD, an SSD, an SD card or others, or may be stored on an external communication network.

[Cross-Correlation Calculation]

Figure 40:
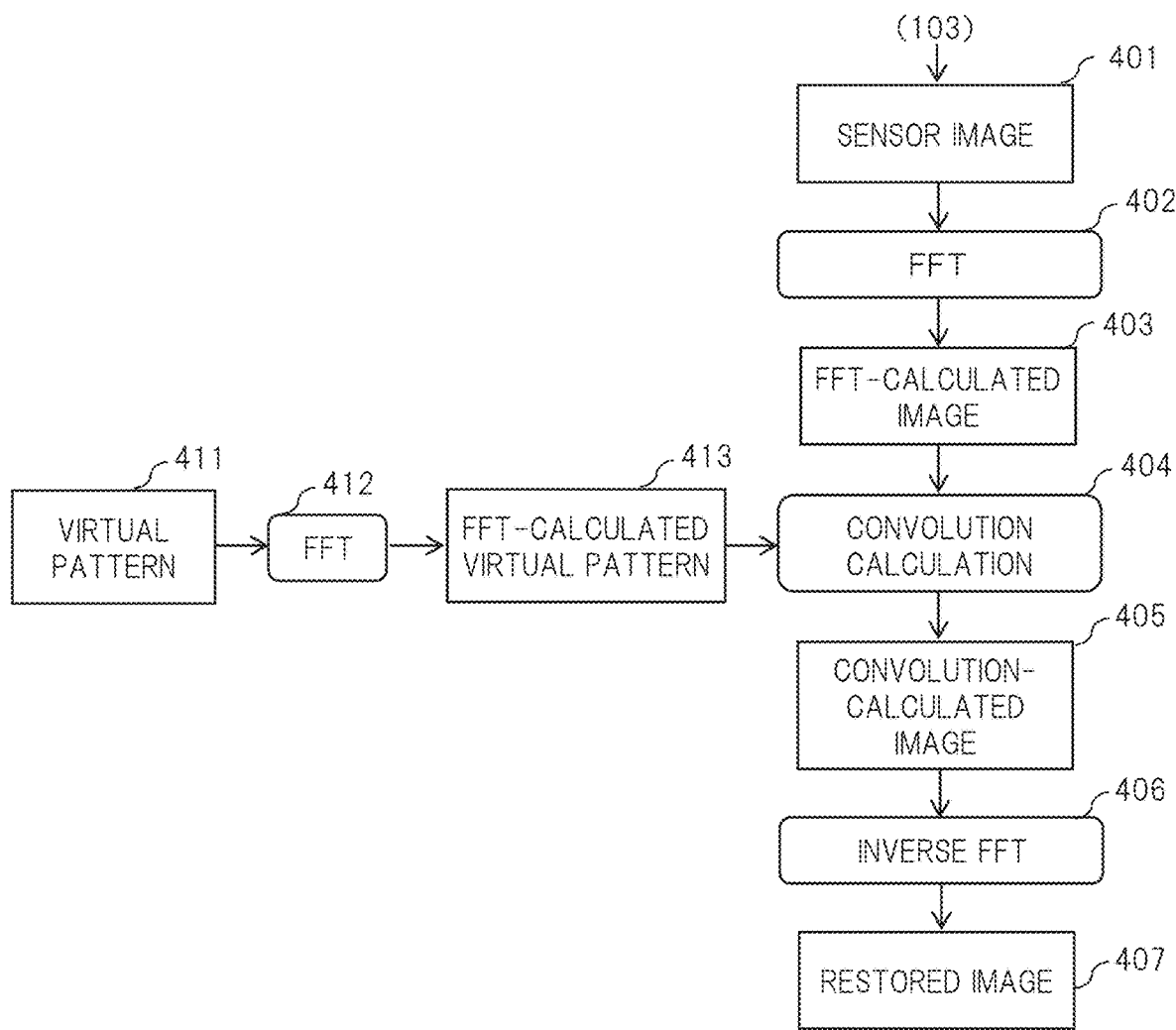
FIG. 40 is a diagram showing an example of cross-correlation calculation for supporting each embodiment.

FIG. 40 shows a configurational example of cross-correlation calculation in the above-described correlation reconstruction method for supporting each embodiment. The image processor 107 performs FFT 402 to the sensor image 401 that is input from the image sensor 103 through the fringe scan processor 106 to provide the FFT-calculated image 403. Meanwhile, the image processor 107 performs FFT 412 to a previously-created virtual pattern 411 (such as the virtual pattern 801) to provide the FFT virtual pattern 413. The image processor 107 performs convolution 404 to the FFT-subjected image 403 with the FFT virtual pattern 413 to provide a convolution-calculated image 405. The image processor 107 performs inverse FFT 406 to the convolution-calculated image 405 to provide a restored image 407. Note that the image processor 107 may execute the process such as the FFT for each imaging in real time. However, the data (such as the FFT virtual pattern 413) that has been previously subjected to the FFT or others may be created and stored in the memory, and the data may be read in the imaging, and then, the calculation may be performed. This manner can achieve the increase in the speed.

EXPLANATION OF REFERENCE CHARACTERS

1 . . . imaging device, 30 . . . pixel, 102 . . . imaging portion, 103 . . . image sensor, 104 . . . pattern substrate, 105 . . . real pattern, 106 . . . fringe scan processor, 107 . . . image processor, 108 . . . controller, 1903 . . . light receiver, 140 . . . micro lens

The invention claimed is:

1. An imaging device comprising:
a modulator configured to modulate an intensity of incident light in accordance with a real pattern;
an image sensor configured to convert the modulated light into an electric signal and create a sensor image; and
a micro lens array including a plurality of micro lenses arranged to correspond to a plurality of pixels of the image sensor,
wherein the imaging device has a distribution property of a relative positional difference amount between a center position of a light receiver of each pixel of the plurality of pixels and a center position of each micro lens of the plurality of micro lenses of the micro lens array in a plane of the image sensor, and
the property has at least one point or more with a changing difference value of the difference amount between the adjacent pixels from a positive value to a negative value or from a negative value to a positive value.

2. The imaging device according to claim 1,
wherein, in the property, the difference amount is at random in accordance with a position in the plane.

3. The imaging device according to claim 1,
wherein, in the property, the difference amount periodically changes in accordance with a position in the plane.

4. The imaging device according to claim 1 further comprising:
an image processor configured to restore an image in accordance with calculation of a virtual pattern for the sensor image.

5. The imaging device according to claim 1 further comprising:
a fringe scan processor configured to control the image sensor and the modulator to cancel noises out of the sensor image.

6. The imaging device according to claim 4,
wherein the image processor divides an entire region of the difference amount into a plurality of regions, classifies a pixel value of the sensor image in accordance with the plurality of regions, performs reconstruction in accordance with calculation of a corresponding virtual pattern for each image of the classified pixel value, and synthesizes a plurality of reconstructed images into one image.

7. The imaging device according to claim 1,
wherein, in the image sensor, a pitch between the plurality of micro lenses is larger than a pitch between the plurality of pixels in the plane.

8. An imaging device comprising:
a modulator configured to modulate an intensity of incident light in accordance with a real pattern;
an image sensor configured to convert the modulated light into an electric signal and create a sensor image;
a micro lens array including a plurality of micro lenses arranged to correspond to a plurality of pixels of the image sensor; and
a scattering member arranged on an entrance side of the micro lens array and configured to scatter the modulated light.

9. An imaging method in an imaging device,
wherein the imaging device includes:
a modulator configured to modulate an intensity of incident light in accordance with a real pattern;
an image sensor configured to convert the modulated light into an electric signal and create a sensor image; and
a micro lens array including a plurality of micro lenses arranged to correspond to a plurality of pixels of the image sensor,
wherein the imaging device has a distribution property of a relative positional difference amount between a center position of a light receiver of each pixel of the plurality of pixels and a center position of each micro lens of the plurality of micro lenses of the micro lens array in a plane of the image sensor, and
the property has at least one point or more with a changing difference value of the difference amount between the adjacent pixels from a positive value to a negative value or from a negative value to a positive value,
the method comprising the steps of:
modulating the intensity of the light by the modulator; and creating the sensor image by the image sensor in accordance with the modulated light having travelled in the modulator and the micro lens array.

10. The imaging method according to claim 9 further comprising the step of:
restoring an image in accordance with calculation of a virtual pattern for the sensor image.

11. The imaging method according to claim 9 further comprising the step of:
controlling the image sensor and the modulator to cancel noises out of the sensor image.

12. The imaging method according to claim 10,
wherein the step of restoring the image includes steps of:
dividing an entire region of the difference amount into a plurality of regions;
classifying a pixel value of the sensor image in accordance with the plurality of regions;
performing reconstruction in accordance with calculation of a corresponding virtual pattern for each image of the classified pixel value; and
synthesizing a plurality of reconstructed images into one image.

* * * * *